US007756956B2

(12) United States Patent
Jean

(10) Patent No.: US 7,756,956 B2
(45) Date of Patent: Jul. 13, 2010

(54) MIMIC SUPPORT ADDRESS RESOLUTION

(75) Inventor: Sebastien A. Jean, Tustin, CA (US)

(73) Assignee: Canon Development Americas, Inc., Irvine, CA (US)

( * ) Notice: Subject to any disclaimer, the term of this patent is extended or adjusted under 35 U.S.C. 154(b) by 1223 days.

(21) Appl. No.: 10/295,425

(22) Filed: Nov. 14, 2002

(65) Prior Publication Data
US 2004/0098506 A1 May 20, 2004

(51) Int. Cl.
*G06F 15/177* (2006.01)
*H04L 12/56* (2006.01)
(52) U.S. Cl. ..................... 709/222; 370/401
(58) Field of Classification Search ............... 370/389, 370/401; 709/222
See application file for complete search history.

(56) References Cited

U.S. PATENT DOCUMENTS

| 5,497,463 | A | | 3/1996 | Stein et al. | 395/200.03 |
|---|---|---|---|---|---|
| 5,568,612 | A | | 10/1996 | Barrett et al. | 395/200.01 |
| 5,724,510 | A | * | 3/1998 | Arndt et al. | 709/220 |
| 5,768,525 | A | | 6/1998 | Kralowetz et al. | 395/200.58 |
| 5,832,191 | A | | 11/1998 | Thorne | 395/114 |
| 5,935,224 | A | | 8/1999 | Svancarek et al. | 710/63 |
| 5,949,779 | A | | 9/1999 | Mostafa et al. | 370/389 |
| 6,032,208 | A | | 2/2000 | Nixon et al. | 710/64 |
| 6,052,788 | A | | 4/2000 | Wesinger, Jr. et al. | 713/201 |
| 6,058,429 | A | | 5/2000 | Ames et al. | 709/242 |
| 6,073,266 | A | | 6/2000 | Ahmed et al. | 714/749 |
| 6,088,120 | A | | 7/2000 | Shibusawa et al. | 358/1.15 |
| 6,098,116 | A | | 8/2000 | Nixion et al. | 710/8 |
| 6,128,664 | A | | 10/2000 | Yanagidate et al. | 709/228 |
| 6,163,383 | A | | 12/2000 | Ota et al. | 358/11.4 |
| 6,163,806 | A | | 12/2000 | Viswanathan et al. | 709/229 |
| 6,205,416 | B1 | | 3/2001 | Butts et al. | 703/27 |
| 6,243,379 | B1 | * | 6/2001 | Veerina et al. | 370/389 |
| 6,321,336 | B1 | * | 11/2001 | Applegate et al. | 726/11 |
| 6,567,405 | B1 | * | 5/2003 | Borella et al. | 370/389 |
| 7,035,915 | B1 | * | 4/2006 | Huo et al. | 709/219 |
| 2002/0078161 | A1 | * | 6/2002 | Cheng | 709/208 |
| 2002/0078371 | A1 | * | 6/2002 | Heilig et al. | 713/200 |
| 2003/0005100 | A1 | * | 1/2003 | Barnard et al. | 709/223 |
| 2003/0112823 | A1 | * | 6/2003 | Collins et al. | 370/474 |
| 2003/0147404 | A1 | * | 8/2003 | Mazo | 370/400 |
| 2006/0020715 | A1 | * | 1/2006 | Jungck | 709/246 |

OTHER PUBLICATIONS

Nassif, Rodolphe et al., "Issues and approaches for migration/cohabitation between legacy and new systems", Association for Computing Machinery, 1993, pp. 471-474.
Robertson, Paul, "Integrating Legacy.Systems with Modern Corporate Applications", Communications of the ACM, May 1977, vol. 40, No. 5, pp. 39-46.
U.S. Appl. No. 09/853,767, filed May 14, 2001.

\* cited by examiner

*Primary Examiner*—Nathan Flynn
*Assistant Examiner*—Chirag R Patel
(74) *Attorney, Agent, or Firm*—Fitzpatrick, Cella, Harper & Scinto

(57) ABSTRACT

Mimicking network devices with a computing device having first and second network interface cards, the first network interface card connecting the computing device to an external network and the second network interface card connecting the computing device to a local network, including obtaining an IP address of a device on the local network, determining an IP address for the second network interface card based on the obtained IP address of the device on the local network, and assigning the determined IP address to the second network interface card.

21 Claims, 27 Drawing Sheets

TARGET DESCRIPTOR TABLE 76

| TARGET | ETHERNET ADDRESS | IP ADDRESS | IP NETWORK MASK | DEFAULT ROUTER | SNMP DEVICE ID |
|---|---|---|---|---|---|
| PRINTER A | 09:F2:12:94:B4:01 | 128.16.210.12 | 255.255.0.0. | 128.16.210.254 | 5.6.3.9.2.7.6 |
| PRINTER B | 07:19:C4:85:A2:2C | 128.16.210.10 | 255.255.0.0. | 128.16.210.254 | 3.7.5.1.7.8.5 |

IN TABLE 110

| TABLE (120) | TIMEOUT (121) | SOURCE IP (122) | DESTINATION IP (124) | SOURCE PORT (125) | DESTINATION PORT (126) | ACTION (128) |
|---|---|---|---|---|---|---|
| IN | STATIC | [LOCAL] | * | [DYN] | * | BRANCH |
| IN | 10 MIN | 126.18.95.6 | 85.210.1.12 | 49651 | 60 | REDIRECT |
| IN | STATIC | * | * | * | * | ACCEPT |

FIG. 8B

OUT TABLE 111

| TABLE (120) | TIMEOUT (121) | SOURCE IP (122) | DESTINATION IP (124) | SOURCE PORT (125) | DESTINATION PORT (126) | ACTION (128) |
|---|---|---|---|---|---|---|
| OUT | STATIC | * | [LOCAL] | * | [DYN] | BRANCH |
| OUT | STATIC | * | * | * | * | ACCEPT |

ROUTING TABLE 74

| DESTINATION | NETMASK | GATEWAY | DEVICE | NOTES |
|---|---|---|---|---|
| 0.0.0.0 | 0.0.0.0 | 201.115.12.224 | EXT | DEFAULT ROUTER |
| 127.0.0.0 | 255.0.0.0 | 127.0.0.1 | LOOP | LOOPBACK |
| 195.52.186.69 | 255.255.255.255 | 127.0.0.1 | LOOP | LOCAL NETWORK DEVICE |
| 201.115.12.0 | 255.255.255.0 | 201.115.12.38 | EXT | EXTERNAL SIDE NETWORK |
| 201.115.12.38 | 255.255.255.255 | 195.52.186.69 | LCL | PRINTER A |
| 201.115.12.89 | 255.255.255.255 | 195.52.186.69 | LCL | PRINTER B |

FIG. 11

| LOCAL IP CHECK 161 | 162 Lcl | 163 Ext | 164 UDP | 165 TCP | Name 166 | 167 ID |
|---|---|---|---|---|---|---|
| Src. IP ≠ Lcl.IP | | x | x | | NIP.EXT.UDP 171 | 0 |
| | | x | | x | NIP.EXT.TCP 172 | 1 |
| Dest. IP ≠ Lcl.IP | x | | x | | NIP.LCL.UDP 173 | 2 |
| | x | | | x | NIP.LCL.TCP 174 | 3 |
| Src. IP ≠ Lcl.IP | | x | x | | IP.EXT.UDP 175 | 4 |
| | | x | | x | IP.EXT.TCP 176 | 5 |
| Dest. IP ≠ Lcl.IP | x | | x | | IP.LCL.UDP 177 | 6 |
| | x | | | x | IP.LCL.TCP 178 | 7 |

MIMIC SUPPORT ADDRESS RESOLUTION

BACKGROUND OF THE INVENTION

1. Field of the Invention

The invention concerns the mimicking of legacy network devices to extend the functional capabilities of the legacy network devices. Specifically, the invention is used to represent one or more legacy network devices by isolating the legacy network devices from the external network and by transparently acting on function requests directed to the legacy network devices for functions which the legacy network devices do not inherently support, and by acting in a manner that reduces the need for initial configuration.

2. Description of the Related Art

U.S. patent application Ser. No. 09/853,767, entitled "Network Device Mimic Support", filed May 14, 2001, described an invention which provides extended functionality of a legacy network device, such as a printer.

The invention of that application represents one or more legacy network devices by residing on both an external network and a local network, isolating the legacy network devices on the local network from the external network, and transparently acting on function requests which are not inherently supported by the legacy network devices. Although a platform implementing the invention resides on both an external network and a local network, the platform behaves in a transparent manner to devices on both of the aforementioned networks.

It is desirable to implement the invention of U.S. patent application Ser. No. 09/853,767 in a manner which reduces the need for configuration by a user or network administrator, and in a manner which reduces potential address conflicts among devices on both the external network and the local network, while still providing transparently extended functionality for one or more of the legacy network devices residing on the local network.

SUMMARY OF THE INVENTION

The present invention addresses the foregoing problems by mimicking legacy network devices, such as printers, to provide additional functional capabilities for the legacy network devices, without the need for a user to configure or modify the legacy network devices, and in a manner which reduces potential address conflicts between devices.

Accordingly, one aspect of the invention concerns mimicking network devices with a computing device having first and second network interface cards, the first network interface card connecting the computing device to an external network and the second network interface card connecting the computing device to a local network, including obtaining an IP address of a device on the local network, determining an IP address for the second network interface card based on the obtained IP address of the device on the local network, and assigning the determined IP address to the second network interface card.

Preferably, reciprocal port mapping rules are created for all messages from legacy network devices on the local network which have a destination address equal to that of the second network interface card, in order to provide accurate message routing between the legacy network devices, applications executing on the computing device, and devices on the external network. In addition, reciprocal port mapping rules are preferably created for all port connection messages from host devices on the external network which have a source address equal to that of the second network interface card, in order to provide accurate message routing between the legacy network devices, applications executing on the computing device, and devices on the external network. Also, replacement port numbers for the aforementioned port mapping rules are preferably obtained from the operating system which is executing on the computing device.

In another aspect of the invention, the invention concerns a method for mimicking network devices, the method being performed in a computing device having first and second network interface cards, the first network interface card connecting the computing device to an external network and the second network interface card connecting the computing device to a local network. The method includes accessing a list of port identifiers corresponding to ports that are to be blocked, creating a gate rule for each port identifier in the accessed list, each gate rule for blocking an incoming message from the external network or the local network which contains the corresponding port identifier from being redirected to one of a plurality of applications hosted in the computing device, tracking a port identifier of a port opened by one of the plurality of applications, determining if the port identifier of the opened port is equal to a port identifier in a gate rule, and accessing, in the case that the port identifier of the opened port is equal to a port identifier of a gate rule, the gate rule and modifying the gate rule from a blocking rule to a redirect rule for redirecting an incoming message from the external network or the local network which contains the port identifier of the opened port to the application which opened the port.

Preferably, ports opened by applications are monitored for closure, and when they close, the gate rule is modified back into a blocking rule. Also, the gate rules are preferably stored in rule tables corresponding to the local network and to the external network, respectively. In addition, when an application opens a port that does not already have a corresponding gate rule, a redirect rule is generated to redirect messages containing the port number to the application.

In yet another aspect, the invention concerns a method for mimicking network devices, the method being performed in a computing device having first and second network interface cards, the first network interface card connecting the computing device to an external network and the second network interface card connecting the computing device to a local network, the method including entering a transition state, enabling a block for incoming messages on the external network and on the local network so as to prevent such messages from being passed through the computing device or responded to by the computing device for a predetermined period of time, entering an active operational state, and removing the block for incoming messages on the external network and on the local network so as to allow such messages to be passed through the computing device or responded to by the computing device.

Preferably, the transition state is entered after search and discovery of legacy network devices on the local network. Also, the block can preferably be implemented as a general gate rule which can be dynamically modified as needed.

By virtue of the foregoing, the invention provides an efficient way to extend the functional capabilities of legacy network devices in a manner which is transparent to other devices on the external network, and in a manner which reduces potential address conflicts among devices. In addition, a user or network administrator is not required to configure or modify legacy network devices in order to implement the invention, thereby resulting in ease and efficiency in implementation. Lastly, the invention provides features which reduce IP address conflicts and port conflicts among legacy network devices on the local network, the mimic device, and devices on the external network, and which allows for accurate message routing among such devices.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 4 is a table diagram depicting a target descriptor table according to one embodiment of the present invention.

FIG. 8A is a block diagram depicting an IN rules table according to one embodiment of the present invention.

FIG. 8B is a block diagram depicting an OUT rules table according to one embodiment of the present invention.

FIG. 11 is a block diagram depicting a routing table according to one embodiment of the present invention.

FIG. 21 is a table for explaining the functionality of dynamic rules according to the present invention.

DETAILED DESCRIPTION OF THE PREFERRED EMBODIMENTS

Figure 1:
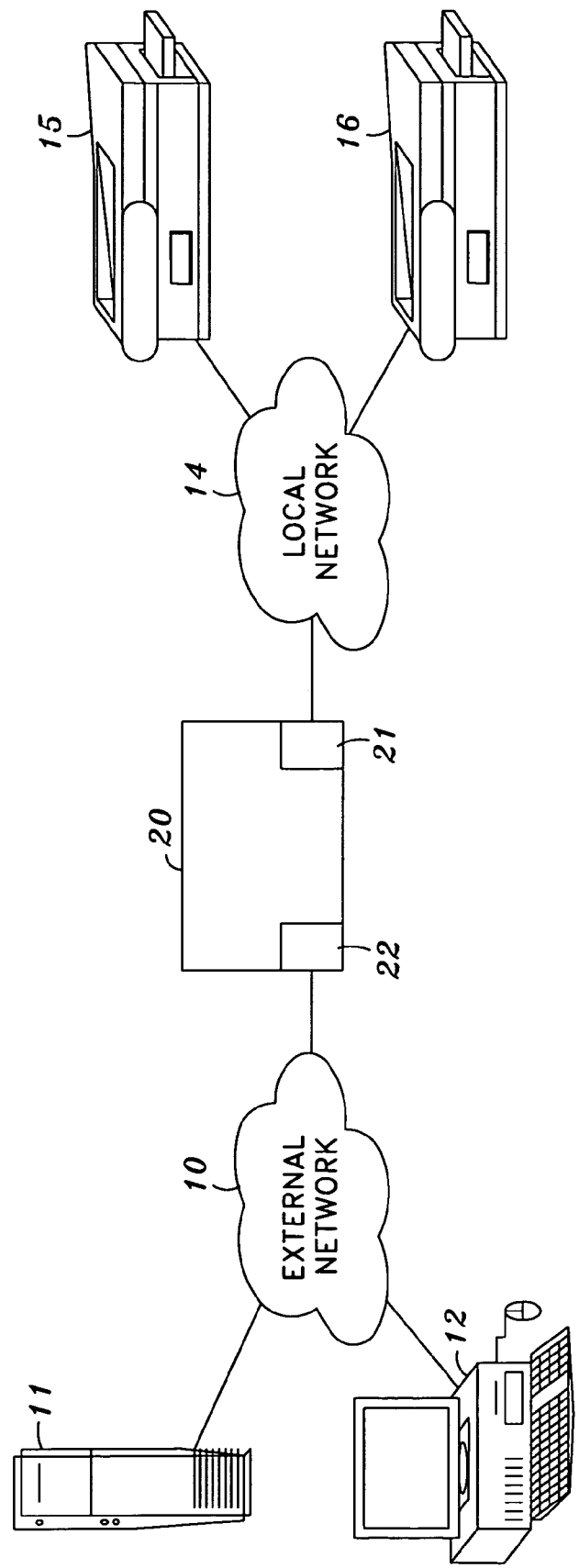
FIG. 1 is a depiction of a network environment in which the present invention may be practiced.

The invention is directed to a mimic device for use in a general network environment in order to augment the functionality of existing network devices. In particular, the mimic device of the present invention utilizes two separate network interface cards in order to allow the mimic device to act as a middle man between the general network which is connected to one of the network interface cards in the mimic device, and a local network which is connected to the second of the network interface cards in the mimic device. In this manner, a number of existing legacy network devices, such as network printers, can be isolated on the local network behind the mimic device from the general, external network. The mimic device can then initially pass through all network traffic from the external network from the first network interface card to the legacy network devices on the local network via the second network interface card. The mimic device listens to the local network and discovers all of the legacy network devices thereon, after which the mimic device can utilize applications within the mimic device to augment the functional capabilities of each discovered legacy network device.

The applications are provided in the mimic device to augment the legacy network devices in order to add functional capabilities on their behalf. For example, if a network printer on the local network behind the mimic device does not have e-mail printing capability, the mimic device can contain an e-mail printing application, whereupon the mimic device intercepts requests from a client on the external network for e-mail printing from a network printer on the local network and then performs the e-mail printing function for the network printer by sending a rendered print job to the network printer in response to the request from the client. In this example, the mimic device responds to the client on the external network using the IP address of the network printer so that the presence of the mimic device is transparent to the client. In addition, the mimic device can support a connection to a client on the external network which is initiated by a legacy network device on the local network. For example, a legacy network device may send a network time protocol (NTP) request which is directed to an NTP server on the external network. The mimic device could intercept the NTP request, modify the transport layer header, insert a new source port id and then update the appropriate header checksum in order to preserve the validity of the message. The message with its updated header would then be sent to the NTP server for processing.

When the response is received, the header destination address is reverted back to what the legacy device expects to see and the checksums are once again updated. During this entire exchange, only the local device port ID and the checksum were modified, everything else was left intact, thus allowing mimic to be transparent to all parties and reducing the amount of protocol awareness required, while still tracking sufficient information to allow the mimic device to perform its required duties. Accordingly, the mimic device provides an efficient and inexpensive way to augment functional capabilities of legacy network devices in a manner which is transparent to network users on the external network.

FIG. 1 depicts a network environment in which the present invention may be practiced. As seen in FIG. 1, external network 10 is a typical network which is preferably supported by TCP/IP and other common network protocols which are discussed further herein. Connected to external network 10 are server 11, which is a typical network server, and workstation 12. Workstation 12 is a typical computing workstation having a host processor with a CPU, fixed disk and RAM, and a display, keyboard and mouse for interacting with the host processor. Server 11 is a typical server having a host processor which includes a CPU, RAM, ROM and a large fixed disk for containing files and/or applications which can be accessed and shared by users on external network 10.

As seen in FIG. 1, mimic device 20 has external network interface card 22 and local network interface card 21. As mentioned above, this allows mimic device 20 to act as a controlled bridge between external network 10 and local network 14. External network interface card 22 connects mimic device 20 to external network 10 and local network interface card 21 connects mimic device 20 to local network 14. A plurality of network devices can be residing on local network 14 for communication with mimic device 20. In the example shown in FIG. 1, legacy network printers 15 and 16 are provided on local network 14 and are therefore in connection with mimic device 20 via local network interface card 21. In addition, it can be appreciated that the mimic device can also be used as a bridge to connect non-internet capable network devices to external network 10. For example, local network 14 could be a USB network, and legacy network printers 15 and 16 could be non-network capable printers. Accordingly, mimic device 20 would act as a bridge between printers 15 and 16 via the USB connection of local network 14 to external network 10.

Each of legacy network printers 15 and 16 has a network interface card (not shown) for connection to local network 14. Legacy network printers 15 and 16 may be typical network printers, such as laser jet printers or ink jet printers, and have certain limited functional capabilities to support network printing applications. For purposes of explaining the present invention, legacy network printers 15 and 16 are assumed to lack certain enterprise printing functional capabilities, such as secure printing, e-mail printing, or some other printer functionality. For this reason, legacy network printers 15 and 16 are isolated from external network 10 by being placed on local network 14 such that mimic device 20 can provide additional enterprise printing functional capabilities for legacy network printers 15 and 16. It should be appreciated that mimic device 20 can be utilized to augment functional capabilities of any network device on local network 14 and is not limited to use with network printers only.

Figure 2A:
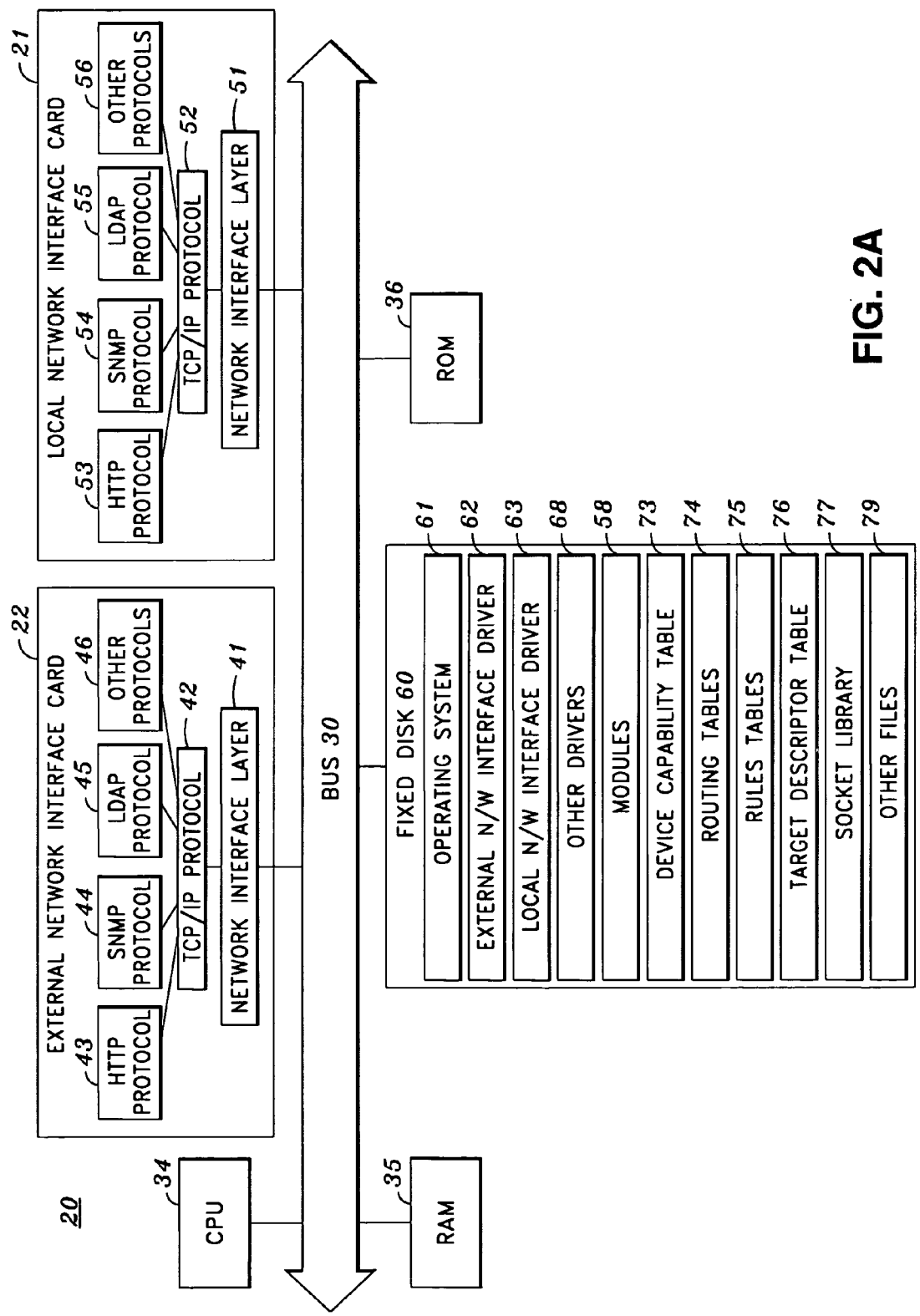
FIG. 2A is a block diagram illustrating an internal architecture of a mimic device according to one embodiment of the present invention.

FIG. 2A is a block diagram for explaining the internal architecture of mimic device 20. As seen in FIG. 2A, mimic device 20 essentially has the configuration of a server or other similar computing device, with the exception that mimic device 20 includes two network interface cards. Mimic device 20 includes system bus 30, CPU 34, RAM 35, ROM 36, external network interface card 22, local network interface card 21 and fixed disk 60.

Central processing unit (CPU) 34 is a programmable microprocessor which is interfaced to bus 30. Random access memory (RAM) 35 is interfaced to bus 30 in order to provide CPU 34 with access to memory storage, thereby acting as the main run-time memory for CPU 34. In particular, when executing stored program instruction sequences, CPU 34 loads the instruction sequences from fixed disk 60 (or other connected memory media) into RAM 35 and then executes those stored program instruction sequences out of RAM 35. It should also be recognized that standard disk-swapping techniques allow segments of memory to be swapped to and from RAM 35 and fixed disk 60.

Read only memory (ROM) 36 stores invariant instruction sequences, such as startup instruction sequences for CPU 34 or such as basic input/output operating system ("BIOS") sequences for the operation of any peripheral devices which may be connected to mimic device 20 (not shown). External network interface card 22 and local network interface card 21 are two separate and distinct network interfaces, thereby allowing mimic device 20 to connect to external network 10 through external network interface card 22 and also to local network 14 through local network interface card 21. As seen in FIG. 2, both external network interface card 22 and local network interface card 21 contain similar protocol stacks for interfacing external network 10 and local network 14, respectively, to mimic device 20. It should be noted that the protocol stacks in local network interface card 21 and in external network interface card 22 do not have to be similar. For example, local network 14 could be using a protocol different from external network 10, such as a token ring protocol, such that the protocol stack in local network interface card 21 would include a protocol layer to support the token ring protocol environment instead of an IP protocol environment.

For example, external network interface card 22 contains network interface layer 41 which is a low-level protocol layer to interface directly with external network 10. TCP/IP layer 42 is provided above network interface layer 41 for supporting communication via the TCP/IP protocol over external network 10. In this manner, mimic device 20 can send and receive TCP/IP messages, often referred to as "frames", over external network 10. In a similar manner, HTTP layer 43, SNMP layer 44, LDAP layer 45 and other layers 46 are provided above TCP/IP layer 42 to support communications over external network 10 using HTTP, SNMP, LDAP and other known networking protocols, respectively. As mentioned above, the protocol stack shown in local network interface card 21 is similar to that of the protocol stack discussed above and therefore will not be explained in detail.

Fixed disk 60 is one example of a computer-readable medium that stores program instruction sequences executable by CPU 34 so as to constitute operating system 61, external network interface driver 62, local network interface driver 63, other drivers 68, modules 58, device capability table 73, routing tables 74, rules tables 75, target descriptor table 76, socket library 77 and other files 79.

Operating system 61 can be a basic operating system such as DOS or UNIX, or can be a common windowing operating system such as Windows NT, or another known operating system. External network interface driver 62 is utilized to drive external network interface card 22 for interfacing mimic device 20 to external network 10. In a similar fashion, local network interface driver 63 is utilized to drive local network interface card 21 for interfacing mimic device 20 to local network 14. Other drivers 68 can be utilized to drive other devices which may be connected to mimic device 20 (not shown) such as a front panel interface for allowing a user to configure and operate mimic device 20, or such as a display monitor, key pad and mouse (not shown) for achieving the same purpose. Modules 58 are utilized to implement the functionality of the present invention and are described more fully below.

Device capability table 73 is utilized to store information regarding the functional capabilities of a range of network devices which may be provided on local network 14 and is utilized to implement the present invention as discussed further below. Routing tables 74 comprises one or more routing tables which are used to route outgoing communications from mimic device 20 over external network interface card 22 or over local network interface card 21 and is described in greater detail below. Rules tables 75 is utilized to implement the functionality of the present invention and is described in more detail below. Target descriptor table 76 is utilized to contain a plurality of target descriptor entries corresponding to the legacy network devices discovered by mimic device 20 on local network 14 and is discussed further below. Socket library 77 is a library used in the present invention to track sockets which are opened up by applications in the mimic device according to the present invention. Lastly, other files 79 contains other files and/or programs necessary to operate mimic device 20 and to provide additional functionality to mimic device 20.

Figure 2B:
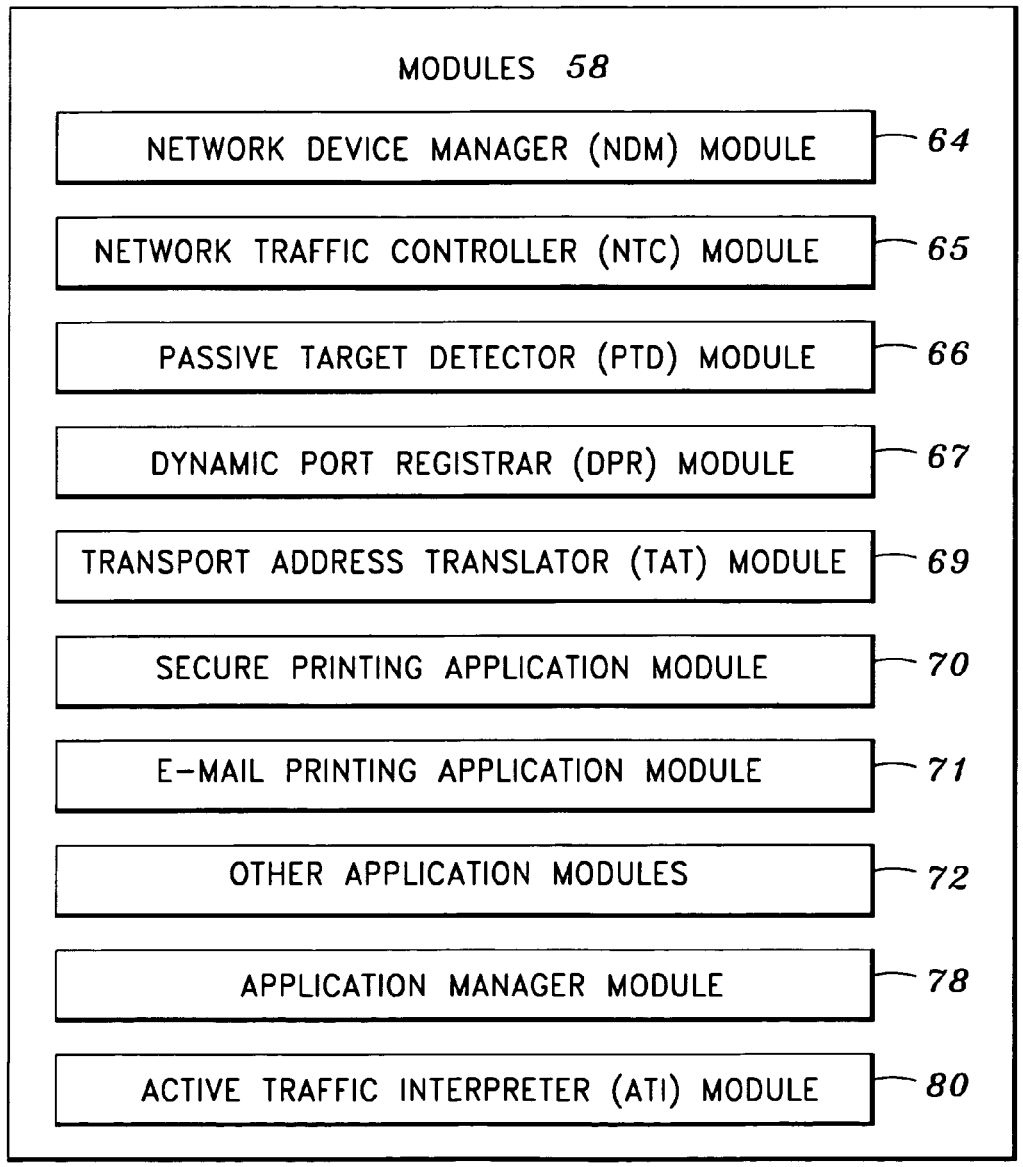
FIG. 2B is a block diagram illustrating the modules contained in the fixed disk of the mimic device depicted in FIG. 2A according to one embodiment of the present invention.

FIG. 2B is a block diagram showing each of the modules in modules 58. Turning to FIG. 2B, it can be seen that modules 58 includes network device manager (NDM) module 64, network traffic controller (NTC) module 65, passive target detector (PTD) module 66, dynamic port registrar (DPR) module 67, transport address translator (TAT) module 69, secure printing application module 70, e-mail printing application module 71, other application modules 72 and application manager module 78. All of the aforementioned modules are specific to implementation of the present invention and will be briefly described here with respect to FIG. 2B, and will be described in more detail below with respect to the other figures.

Network device manager module 64 is a low-level module utilized to implement the present invention for receiving and sending messages, known as frames, to and from each of external network interface card 22 and local network interface card 21. Network traffic controller module 65 is utilized to implement the present invention and determines, in conjunction with rules from rules tables 75, whether certain messages should be handled by mimic device 20 for one of the legacy network devices on local network 14, or should simply be passed through to the corresponding legacy network device on local network 14. Passive target detector module 66 is utilized to implement the present invention and essentially discovers the legacy network devices residing on local network 14 by obtaining network-related and other functional information with respect to each discovered legacy network device. Passive target detector (PTD) module 66 also performs periodic polling for confirming the status of each discovered legacy network device.

Dynamic port registrar module 67 is utilized to implement the present invention by monitoring ports opened up by applications within mimic device 20 and to create rules for redirecting messages (frames) to the corresponding applications, as needed, so that the applications may act for one or more legacy network devices on local network 14. Transport address translator module 69 is utilized to implement the present invention by monitoring sockets opened by the legacy network devices on local network 14 and to map the corresponding socket identifiers to newly-created socket identifiers in order to avoid socket identifier conflicts with the sockets which are opened by applications in mimic device 20.

Secure printing application module 70 and e-mail printing application module 71 are examples of application modules which can be provided in mimic device 20 in order to augment the functional capability of legacy network printers 15 and 16, or other legacy network devices, on local network 14. For example, legacy network printer 15 may have the functional capability to support e-mail printing, but may not have the functional capability to support secure printing. In this regard, mimic device 20 would utilize secure printing application module 70 to respond to frames received from external network 10 which requests secure printing services from legacy network printer 15. In a similar fashion, if legacy network printer 16 does not support e-mail printing, mimic device 20 would utilize e-mail printing application module 71 to act for legacy network printer 16 for incoming requests from external network 10 for e-mail printing services from legacy network printer 16. In this manner, it appears to clients on external network 10, such as workstation 12, that each of legacy network printers 15 and 16 has the capability to support secure printing and e-mail printing when in fact mimic device 20 is providing such additional functional capabilities for the printers in a transparent manner. Other application modules 72 is utilized to support other additional applications to augment the functional capabilities of legacy network devices residing on local network 14. Application manager module 78 is utilized by the present invention to initiate one or more of the aforementioned applications as needed to augment the functional capabilities of each legacy network device. Lastly, active traffic interpreter module (ATI) 80 is utilized to implement another embodiment of the present invention in which discovery of the legacy network devices residing on local network 14 is performed by actively searching for the legacy network devices and obtaining network-related and other functional information with respect to each discovered legacy network device. These modules will be discussed in greater detail below with respect to the remaining figures.

Figure 3:
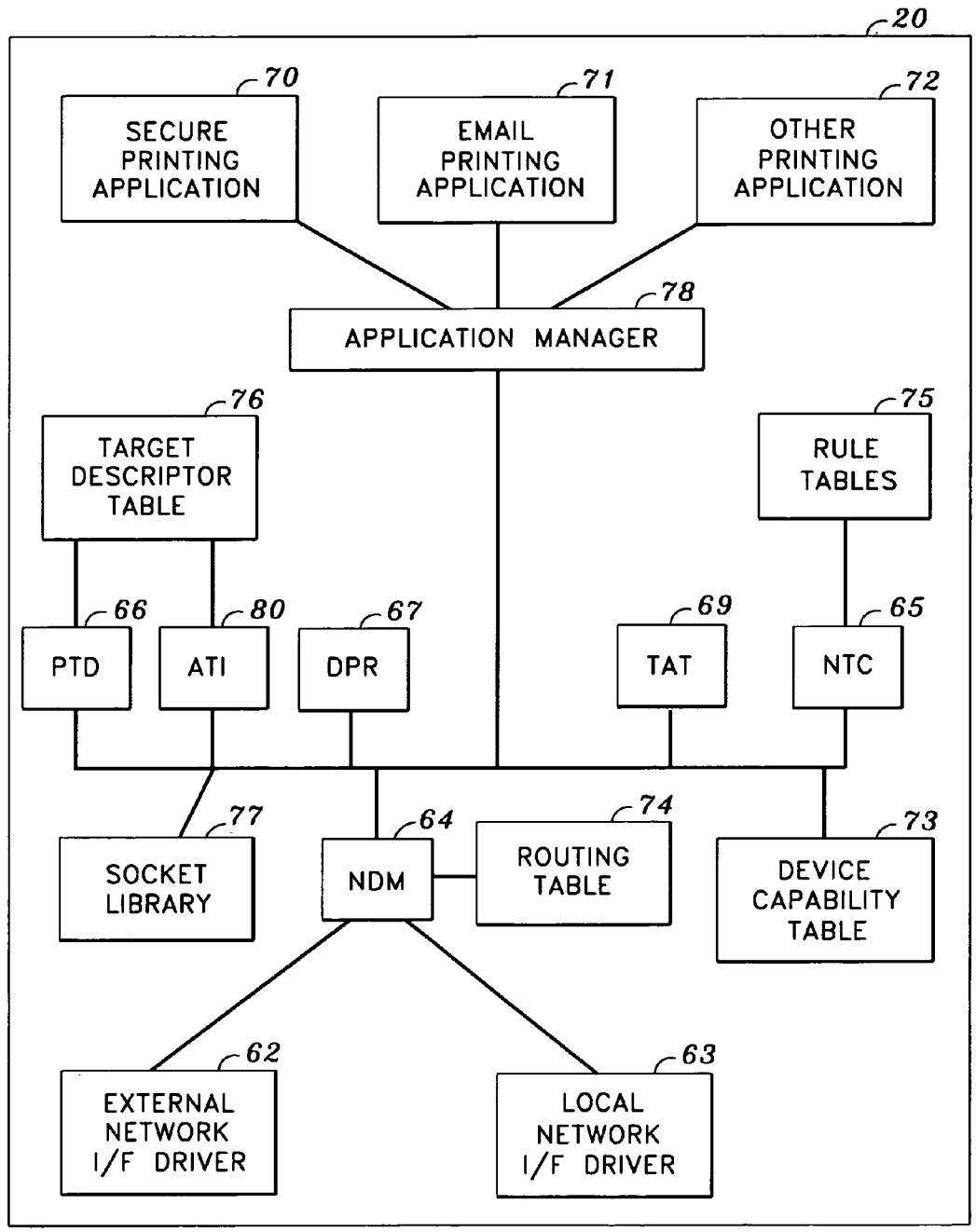
FIG. 3 is a block diagram depicting the functional components of a mimic device according to one embodiment of the present invention.

FIG. 3 is a diagram depicting the functional modules of mimic device 20. NDM 64 manages device drivers utilized by mimic device 20 such as external network interface driver 62, local network interface driver 63 and drivers associated with devices supported by mimic device 20 connected to local network 14. External network interface driver 62 facilitates sending and receiving packets to and from external network 10. Local network interface driver 63 facilitates sending and receiving packets to and from local network 14. Additionally, NDM 64 maintains routing table 74, which is utilized by NDM 64 for routing packets sent by mimic device 20.

NTC 65 processes frames received by NDM 64 from either external network 10 or local network 14, as well as frames being sent by applications running internally on mimic device 20. NTC 65 processes frames by applying a series of rules to each frame. The rules are contained in rule tables 75, which are managed by NTC 65. PTD 66 detects and monitors devices on local network 14. PTD 66 maintains target descriptor table 76, which contains parameters defining the detected devices, such as printer 15 and printer 16. Additionally, PTD 66 notifies other modules within mimic device 20 of any changes to the detected devices defined in target descriptor table 76. In a similar, another embodiment of the invention used ATI 80 which actively discovers legacy network devices and maintains target descriptor table 76, which contains parameters defining the detected devices, such as printer 15 and printer 16. Additionally, ATI 80 notifies other modules within mimic device 20 of any changes to the detected devices defined in target descriptor table 76.

DPR 67 monitors the opening and closing of sockets by applications running on mimic device 20, and interacts with NTC 65 to ensure that frames processed by NTC 65 are channeled correctly. In monitoring sockets, DPR 67 refers to socket library 77, which contains socket descriptors defining the sockets opened by applications running on mimic device 20. TAT 69 monitors the assignment of port numbers by devices on local network 14, and when necessary prevents conflicts between those devices and applications running on mimic device 20.

Application manager module 78 manages the applications being run on mimic device 20. Upon being notified of a new device by PTD 66, application manager module 78 determines which application should be launched to augment the capabilities of the newly detected device. Possible application modules include secure printing application module 70, which provides secure printing services between a host on external network 10 and a device on local network 14, such as printer 15 or printer 16. Additionally, e-mail printing applications module 71 provides e-mail printing functionality from a host on external network 10 to a device on local network 14. Additional functionality can be added to mimic device 20 by including other applications to provide needed services. Future applications are represented in FIG. 3 by other printing application module 72.

The above description of the functional modules has been provided in order to briefly introduce their purposes. A more detailed description of the functioning and interactions of these modules will be provided below.

FIG. 4 is a depiction of target descriptor table 76. Each entry in target descriptor table 76 is defined by several parameters. Target 100 is an identifier corresponding to a detected device on local network 14. Ethernet address 101 provides the ethernet address of the detected device. IP address 102 provides the IP address of the detected device. IP network mask 104 provides the netmask associated with the detected device. Default router 105 provides the address of the default router associated with the detected device. SNMP object identifier 106 provides the SNMP object identifier assigned to the detected device. The creation and maintenance of these entries are performed by PTD 66, and will be described in more detail below.

Figure 5:
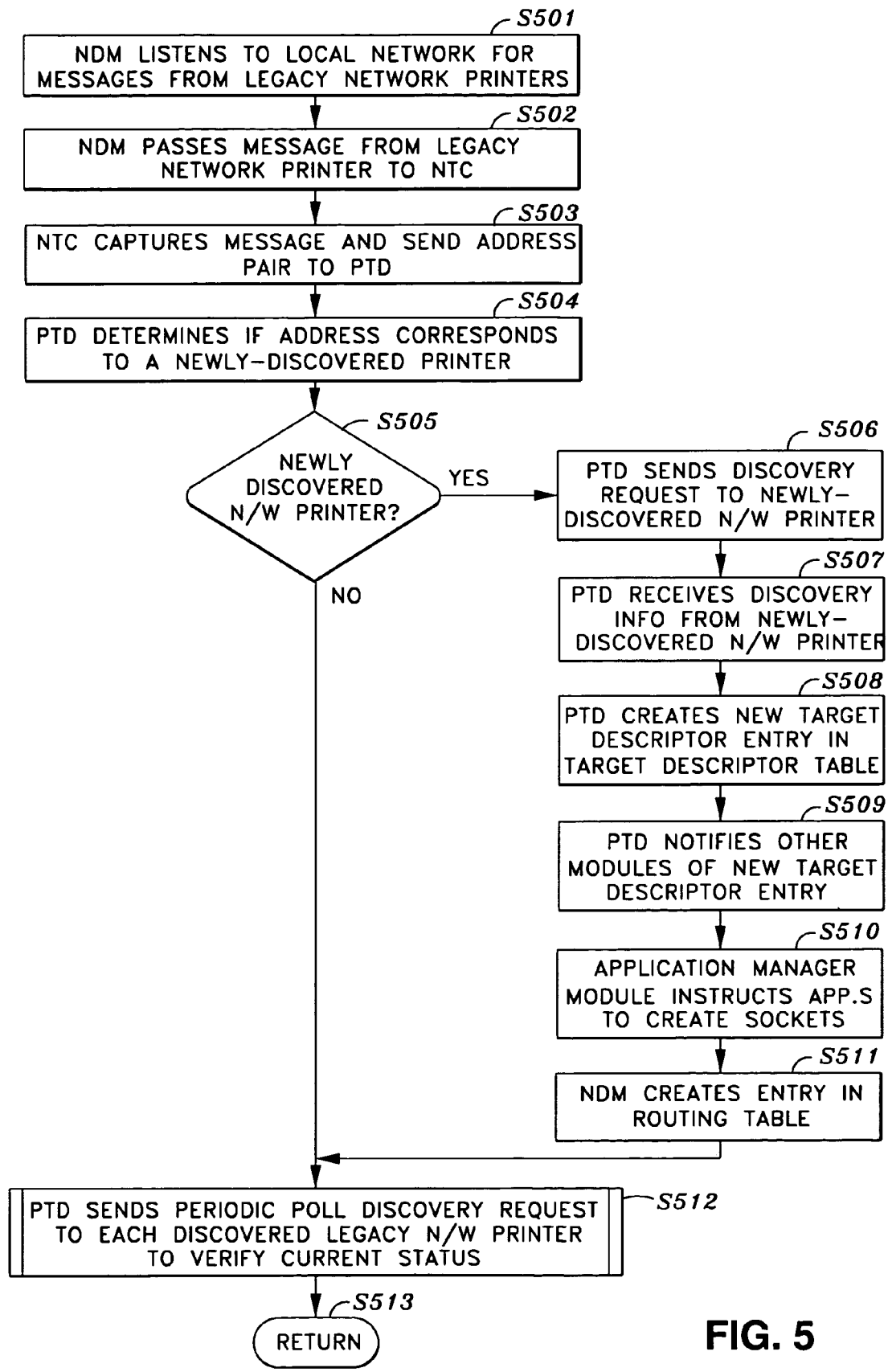
FIG. 5 is a flowchart for explaining a discovery process according to one embodiment of the present invention.

FIG. 5 is a flowchart for describing the discovery process by which mimic device 20 discovers each of the legacy network devices, such as legacy network printers 15 and 16 on local network 14. Turning to FIG. 5, it can be seen in step S501 that NDM 64 listens through local network interface card 21 for network messages on local network 14 from any of the legacy network devices, such as legacy network printers 15 and 16 on local network 14. Specifically, in an ethernet environment supporting TCP/IP, NDM 64 listens for frames from any device on local network 14. In this manner, when a network printer on local network 14 sends a TCP/IP frame containing its source IP address, NDM 64 captures the frame. It should be recognized that NDM 64 is indiscriminate in this function in that it simply passes frames to NTC 65 corresponding to all network messages which it detects over both external network 10 and local network 14. In particular, NDM 64 interfaces with external network interface driver 62 and local network interface driver 63 to receive frames from external network 10 and local network 14, respectively.

Next, once NDM 64 has detected a frame on local network 14, it passes the frame up to NTC 65 in step S502. Preferably, when PTD 66 is initialized, it creates a general capture rule which is placed in rules tables 75 for instructing NTC 65 to capture all frames that are passed to it which have been sent over local network 14 from a legacy network device having a source IP address within a given predetermined range. Accordingly, in step S503, NTC 65 examines the frame passed to it from NDM 64 to determine if the frame contains a source IP address within the IP address range in the broad capture rule. If so, NTC 65 captures the frame and sends the address pair from the frame, consisting of the source IP address and the ethernet address corresponding to local network 14, to PTD 66 (step S503).

In step S504, PTD 66 examines target descriptor table 76 to determine if the address pair passed to it from NTC 65 contains a source IP address which does not yet have a target descriptor entry in target descriptor table 76. If no such entry exists, PTD 66 identifies the source IP address from the address pair as corresponding to a newly-discovered legacy network printer (step S504). In step S505, PTD 66 queries whether it has been determined that the source IP address of the address pair corresponds to a newly-discovered legacy network printer and, if not, flow passes to step S512. If, however, the source IP address in the address pair corresponds to a newly-discovered legacy network printer, flow passes to step S506 in which PTD 66 sends an SNMP discovery request over local network 14 to the newly-discovered legacy network printer corresponding to the source IP address from the address pair. It should be noted that SNMP is only one example of a protocol for supporting the discovery message sent from mimic device 20 the legacy network devices on local network 14. For example, other known protocols could be used for the discovery message, such as lightweight directory access protocol (LDAP), or a proprietary protocol could be used. Preferably, PTD 66 also prepares at this point a basic target descriptor entry for input into target descriptor table 76 wherein the entry contains the source IP address and the ethernet address from the address pair.

As explained above with respect to FIG. 3, the SNMP discovery request sent from PTD 66 is passed to NDM 64 which determines from routing table 74 that the SNMP discovery request message should be sent through local network interface card 21 and over local network 14 to the corresponding newly-discovered legacy network printer.

In step S507, PTD 66 receives SNMP discovery information from the newly-discovered legacy network printer via NDM 64 and NTC 65. Preferably, the SNMP discovery information from the newly-discovered legacy network printer includes an IP network mask, a default router, and an SNMP device ID. The SNMP device ID for the corresponding newly-discovered legacy network printer allows mimic device 20 to determine the make and model and the existing functional capabilities of the newly-discovered legacy network printer. For this reason, device capability table 73 provides a cross-reference between a given SNMP device ID and the corresponding make, model, functional information and other related information for the network printer corresponding to the SNMP device ID.

In step S508, PTD 66 creates a new target descriptor entry in target descriptor table 76 based on the SNMP discovery information received by PTD 66 from the newly-discovered legacy network printer. As mentioned earlier, PTD 66 has preferably already set up a basic target descriptor entry containing the IP address and ethernet address of the newly-discovered legacy network printer. PTD 66 fills in the remaining fields of the target descriptor entry corresponding to the newly-discovered legacy network printer with the received SNMP discovery information. In this manner, a target descriptor entry now exists in target descriptor table 76 corresponding to each discovered legacy network device, such as legacy network printers 15 and 16, on local network 14. The target descriptor entry contains the address information necessary to reach each discovered legacy network device and also contains a corresponding SNMP device ID from which information related to the identity and functional capabilities of the legacy network device can be derived.

In step S509, PTD 66 notifies other modules in mimic device 20 that a new target descriptor entry has been entered in target descriptor table 76. Preferably, PTD 66 performs this notification by publishing the new target descriptor entry to all modules in mimic device 20 which have previously subscribed with PTD 66 to be notified of such an event. For example, application manager module 78 subscribes to PTD 66 upon initialization of application manager module 78 to receive each target descriptor entry that is created and entered in target descriptor table 76. In this manner, application manager module 78 can be made aware of newly-discovered legacy network devices on local network 14 in order to initiate the necessary applications which are needed to augment the functional capabilities of the newly-discovered legacy network device. For example, if PTD 66 determines that legacy network printer 15 is a newly-discovered device, then PTD 66 creates a new target descriptor entry after performing the aforementioned SNMP discovery and then notifies application manager module 78 of the new target descriptor entry corresponding to legacy network printer 15. In this example, application manager module 78 then initiates the applications which are necessary to augment the functional capabilities of legacy network printer 15 which are determined from device capability table 73. If legacy network printer 15 does not inherently support e-mail printing capabilities, application manager module 78 instructs e-mail printing application module 71 to perform this service for legacy network printer 15 (step S510). Preferably, each application in mimic device 20 which acts for a given legacy network device opens a socket for receiving frames for that device. The details of this aspect of the invention are discussed further below with reference to other figures.

Next, in step S511, NDM 64 creates a new entry in routing table 74 based on the address pair comprised of the IP address and ethernet address of the newly-discovered legacy network printer. In this manner, when NDM 64 subsequently receives an outgoing frame containing a destination address corresponding to the IP address of the discovered legacy network printer, NDM 64 will determine based on routing table 74 that the frame should be sent through local network interface card 21 over local network 14 to the discovered legacy network printer corresponding to the IP address. In step S512, PTD 66 sends a periodic poll discovery message to each legacy network printer which has been discovered and has a target descriptor entry in target descriptor table 76 in order to verify the current status of each discovered legacy network printer. The details of this step are discussed further with respect to FIG. 6. Flow then passes to return in step S513.

Figure 6:
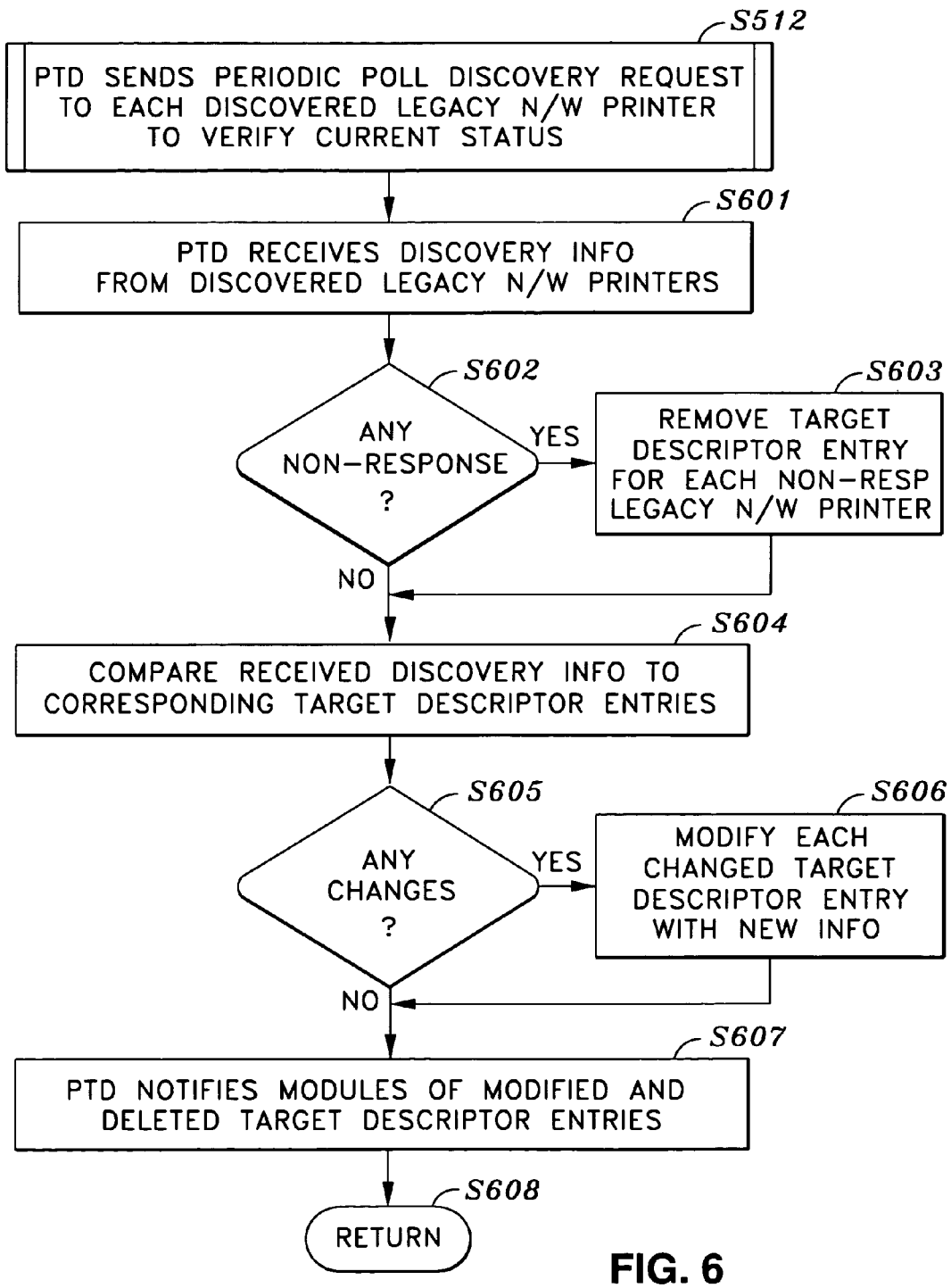
FIG. 6 is a flowchart for explaining a periodic polling discovery process according to one embodiment of the present invention.

FIG. 6 is a flowchart for explaining the periodic polling discovery which is performed in step S512 of the flowchart of FIG. 5. First, in step S512, PTD 66 sends a periodic SNMP discovery request to each legacy network device, such as legacy network printers 15 and 16, which have target descriptor entries in target descriptor table 76. The SNMP discovery request is the same as that discussed above with regard to the initial discovery of each legacy network device on local network 14. Next, in step S601, PTD 66 receives SNMP discovery information from each legacy network device, such as legacy network printers 15 and 16, which respond to the periodic discovery request (step S601). In step S602, PTD 66 determines whether there has been a non-response for any of the legacy network devices which have been sent a periodic SNMP discovery request. If there has been a non-response, the target descriptor entry corresponding to the legacy network device which did not respond is removed from target descriptor table 76 (step S603). Preferably, PTD 66 sets an expiration timer corresponding to each target descriptor entry in target descriptor table 76 when the corresponding target descriptor entry is created or verified as the result of periodic discovery polling.

If a non-response occurs, PTD 66 simply does not update the expiration timer corresponding to the target descriptor entry for the non-responding legacy network device. A service then preferably periodically cleans out target descriptor table 76 of all target descriptor entries having expired expiration timers. In this manner, the appropriate target descriptor entries in target descriptor table 76 are removed when their corresponding legacy network devices fail to respond to periodic discovery polling. Next, in step S604, the SNMP discovery information received from each responding legacy network device in response to the periodic discovery request is compared to the data in each corresponding target descriptor entry in target descriptor table 76. In step S605, it is determined for each responding legacy network device whether the data in the corresponding target descriptor entry has changed based on the received SNMP discovery information in response to the periodic SNMP discovery request. If the information has changed, flow passes to step S606 in which the target descriptor entry for the corresponding legacy network device is modified with the new information received in the SNMP discovery information from the legacy network device in response to the periodic SNMP discovery request. In step S607, PTD 66 notifies other modules in mimic device 20 of each modified and deleted target descriptor entry. This notification is performed as discussed above whereby the aforementioned changed target descriptor entries are published to each module in mimic device 20 which has previously subscribed with PTD 66 to receive such notification. Flow then passes to return in step S608.

Figure 16:
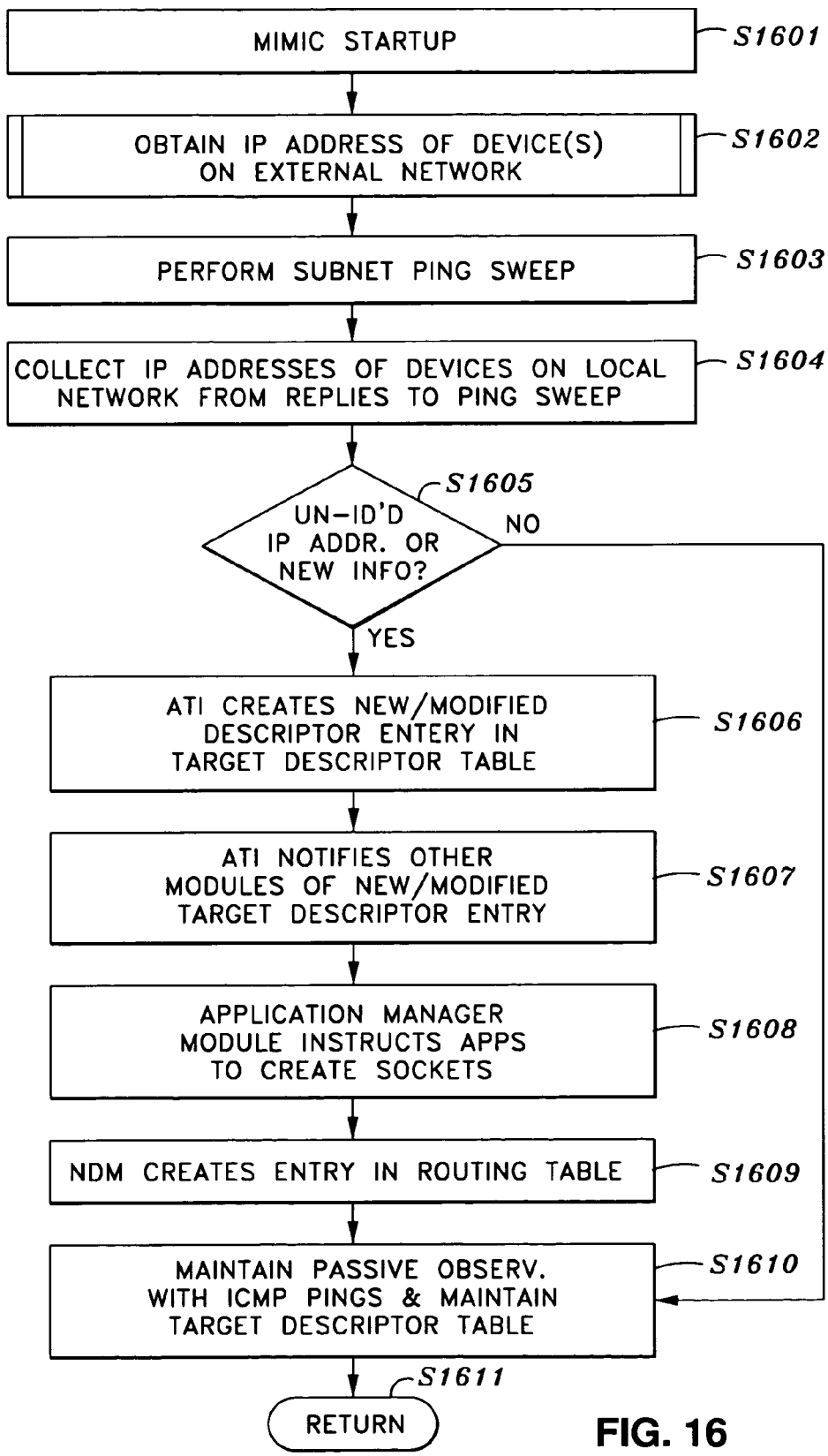
FIG. 16 is a flowchart for explaining an active discovery process according to a further embodiment of the present invention.

In addition to the foregoing passive discovery method for discovering address and information regarding each target device on the local network, an alternative embodiment of the invention utilizes an active discovery method in order to quickly discover all target devices on the local network. FIG. 16 depicts the active discovery method of the alternative embodiment of the invention, in which active traffic interpreter (ATI) module 80 is used instead to PTD 66 in order to identify the target devices on local network 14.

In general, as seen in FIG. 16, active device discovery is first conducted by obtaining at least one IP address of a device on external network 10, as a result of one or more monitoring techniques. The IP address of the device on external network 10 is used as a seed address in an attempt to determine the subnet on which the legacy network devices reside on local network 14. Then, a subnet ping sweep based on the obtained IP address is performed on local network 14 to obtain IP addresses of all legacy network device on local network 14, and discovery queries are sent to each of the legacy network devices to identify information related to each device. After the initial search and discovery of legacy network devices, periodic targeted pings and various other techniques are used to confirm the presence of the legacy network devices and to discover any new or changed legacy network devices. In the event that a connection on local network 14 is broken, a partially-active state is utilized in which limited support of extended functionality of the target legacy network devices is continued, while the foregoing search and discovery steps are repeated in an attempt to re-discover the legacy network devices on local network 14.

The functionality of ATI 80 for conducting discovery of legacy network devices is preferably implemented through a plurality of task specific frame monitors, each of which can have both a passive and an active component, wherein the components are either tightly or loosely related. Generally speaking, each monitor has a targeted active component that is geared to a very specific task, such as sending query messages to generate replies from the legacy network device on local network 14. The passive component, although associated with the active component, does not limit itself to only interpreting replies that are generated in response to the question posed by the active element.

When a frame comes into mimic device 20 from either network, the frame is passed to the frame monitors of ATI 80 for processing. The passive component of each of the monitors inspect the contents of the frame and extract information that is relevant for that specific monitor. For example, a passive monitor may obtain only the IP/Ethernet address pair from the frame, while a DHCP monitor may obtain only DHCP related information from the frame. In contrast, the active component of each monitor is simply a means by which the monitor can stimulate network traffic of the type that is passively monitored by the passive component.

It should be noted that each frame monitor is not necessarily fully equipped with the protocol corresponds to that frame monitor. For example, the passive component of a DHCP frame monitor may only be designed to glean certain DHCP related information from a frame, and the active component of the DHCP frame monitor may only be designed to send DHCP query messages in order to elicit DHCP replies. Accordingly, the DHCP frame monitor only needs DHCP capabilities and would not necessarily implement the full host of DHCP client/server functionality. In this manner, memory and processor resources of mimic device 20 are conserved while still providing the necessary functionality for the present embodiment of the invention.

Turning to step S1601 of FIG. 16, startup of mimic device 20 is initiated, such as at power-up. In step S1602, ATI 80 obtains an IP address of at least one device on external network 10, to be used as a seed address for performing a subnet ping sweep in an attempt to obtain reply messages from the legacy network devices on local network 14. Preferably the IP address is obtained in response to one or more different techniques implemented by the active component of the aforementioned frame monitors. Step S1602 is explained in more detail in FIG. 17 in which different frame monitors are depicted while operating in both the passive and active states. At least one of the frame monitors is used for obtaining an IP address of a device on external network 10.

Figure 17:
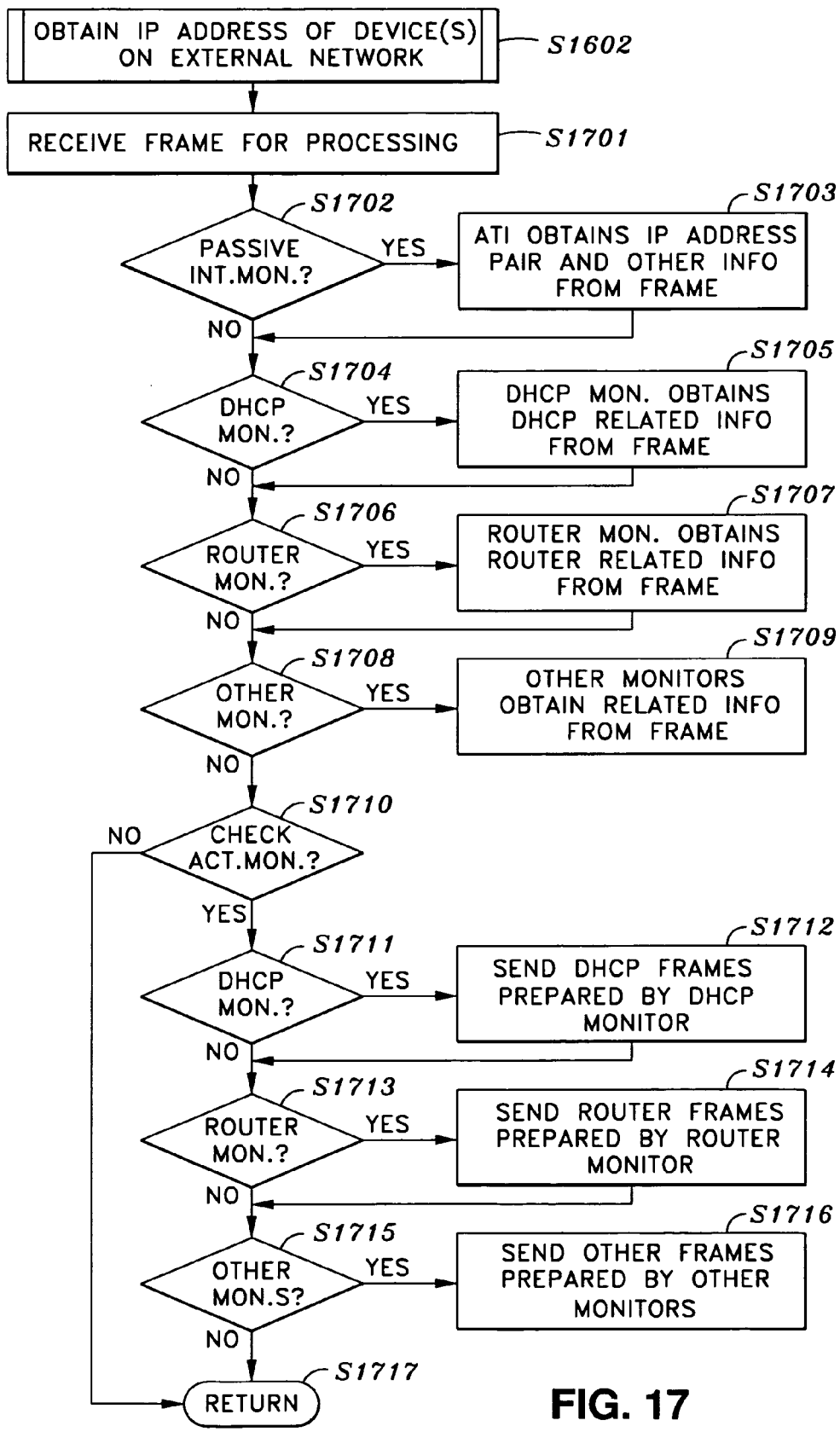
FIG. 17 is a flowchart for explaining the step of obtaining device addresses as shown in FIG. 16.

As seen in FIG. 17, a copy of a received frame is sent to ATI 80 for processing. Next, in steps 1702 through 1708, the frame is sent to the frame monitors of ATI 80 for processing. In general, if the frame contains information of interest to a particular frame monitor, the frame monitor will extract that information from the frame for use by mimic device 20, such as entry into target descriptor table 76. In step S1702, a passive interpreter monitor determines if the frame contains information of interest. If there is no information of interest, flow passes to step S1704. On the other hand, if there is information of interest, flow passes to step S1703 in which the passive interpreter monitor of ATI 80 obtains the IP/Ethernet address pair, and any other information of interest, from the frame. Flow then passes to step S1704.

In step S1704, a DHCP monitor determines if the frame contains information of interest. If there is no information of interest, flow passes to step S1706. On the other hand, if there is information of interest, flow passes to step S1705 in which the DHCP monitor of ATI 80 obtains DHCP related information of interest from the frame. Flow then passes to step S1706.

In step S1706, a router monitor determines if the frame contains information of interest. If there is no information of interest, flow passes to step S1708. On the other hand, if there is information of interest, flow passes to step S1707 in which the router monitor of ATI 80 obtains router related information of interest from the frame. Flow then passes to step S1708.

In step S1708, the frame is passes to other frame monitors, each of which determines if the frame contains information of interest to that particular frame monitor. Examples of other frame monitors include, but are not limited to, an ARP monitor for handling ARP frames, an SNMP monitor for handling SNMP frames, and other types of frame monitors. Of course, each of the aforementioned types of other monitors can include both active and passive components. If there is no information of interest to the other frame monitors, flow passes to step S1710. On the other hand, if there is information of interest, flow passes to step S1709 in which the other monitor of ATI 80 obtains related information of interest from the frame. Flow then passes to step S1710.

In step S1710, it is determined whether ATI 80 is to check the frame monitors for action initiated by the active component of each frame monitor. If not, then flow passes to return in step S1717. If so, then flow passes to step S1711 in which it is determined if the active component of the DHCP frame monitor has initiated action for processing. In particular, it is determined if the DHCP monitor has generated DHCP frames, such as DHCP queries, to be sent out from mimic device 20. If not, flow passes to step S1713. If so, flow passes to step S1712 in which the generated DHCP frames are sent out from mimic device 20 through NDM 64. As another example, the active component of an ICMP frame monitor may have generated ICMP queries for local network 14 in order to elicit ICMP replies from the legacy network devices on local network 14. In this manner, the presence of the legacy network devices on local network 14 can be discovered by the passive components of the frame monitors as they process the ICMP replies. Flow then passes to step S1713.

In step S1713, it is determined if the active component of the router frame monitor has initiated action for processing. In particular, it is determined if the router monitor has generated router frames, such as router queries, to be sent out from mimic device 20. If not, flow passes to step S1715. If so, flow passes to step S1714 in which the generated router frames are sent out from mimic device 20 through NDM 64. For example, the active component of the router frame monitor may have generated router queries for local network 14 in order to elicit a router reply from a router on external network 10. In this manner, information from a router on local network 14 can be discovered by the passive components of the frame monitors as they process the router replies. Flow then passes to step S1715.

In step S1715, it is determined if the active component of some other frame monitor has initiated action for processing. In particular, it is determined if the other frame monitor has generated certain frames corresponding to the other frame monitor which are to be sent out from mimic device 20. If not, flow passes to return in step S1717. If so, flow passes to step S1716 in which the generated frames are sent out from mimic device 20 through NDM 64. For example, the active component of an SNMP frame monitor may have generated an SNMP query for local network 14 in order to generate SNMP replies from a legacy network devices on local network 14. In this manner, information of legacy network devices on local network 14 can be discovered by the passive components of the frame monitors as they process the legacy network device replies. Flow then passes to return step S1717.

After at least one IP address for a device on external network 10 has been obtained in step S1602, flow passes to step S1603 in which ATI 80 performs a subnet ping sweep of local network 14 in order to detect all devices on local network 14. The subnet ping sweep is effective because a device on external network 10 will most likely be on the same subnet as one or more of the legacy network devices on local network 14. Since the specific subnet is not known, ATI 80 uses the obtained IP address of a device on external network 10 as a seed to generate possible subnet values for sending out subnet echo requests on local network 14.

In particular, a given network has at least one subnet. Furthermore, traffic on this network is almost always generated by hosts that are part of one of the subnets on said network. By using one or more IP addresses detected on external network 10, mimic device 20 can apply successively larger and larger subnet masks in an attempt to sweep up the entire range of possible subnets using at most 32 subnet echo requests per "seed" IP address. For example, assume that the obtained seed IP address 192.168.26.110 is detected on external network 10 in step S1602. If one first applies a mask to the seed address by using the arithmetic "OR" operation starting with 0.0.0.1, followed by 0.0.0.2, then 0.0.0.4 and all the way up to 128.0.0.0, there is a likely probability of generating the subnet broadcast address to which the seed IP address belongs.

In most cases, a target legacy network device on local network 14 will respond to at least one of these subnet echo requests. While in search state, there is no harm in repeating this process with different IP seed addresses until a reply is generated. For example, it is possible that a particular seed address, when repeatedly masked as described above, may not eventually result in the needed subnet broadcast address because of the particular bit pattern of that seed address. In such a case, a new seed address is obtained and another subnet ping sweep is performed in an effort to generate replies from the legacy network devices on local network 14, so that they may be discovered. Once a target legacy network device does reply to the echo request, the reply contains both an Ethernet and an IP address corresponding to the legacy network device. This information is sufficient for mimic device 20 to enter an active state.

Returning to step S1603, ATI 80 sends out a series of subnet echo requests on local network 14 based on at least one IP address obtained on external network 10 in step S1602. In step S1604, all replies to the subnet echo requests on local network 14 are picked-up by NDM 64 and passed to NTC 65 which passes the frame to ATI 80 for processing by the passive components of the frame monitors, as described above with respect to FIG. 17. In this manner, ATI 80 obtains, from the passive components of the frame monitors, a list of observed IP addresses on local network 14 corresponding to legacy network devices on local network 14. More detailed discovery can then be performed by ATI 80 in order to obtain device information of the device corresponding to each observed IP address on local network 14.

In this regard, flow passes to step S1605 in which each observed IP address from step S1604 is compared to the entries in target descriptor table 76 to determine if the IP address is one that has not previously been identified by mimic device 20, and to determine if new information has been obtained by the frame monitors for a previously identified IP address. If the answer to both questions is negative, flow passes to return in step S1611. If the IP address is unidentified or if new information has been obtained for a previously identified IP address, flow passes to steps S1606 through S1610 in which ATI 80 updates target descriptor table 76 and notifies the other modules in mimic device 20 so that extended functionality of mimic device 20 can be activated for the discovered legacy network device.

In step S1606, ATI 80 creates a new or modified target descriptor entry in target descriptor table 76 with on the information obtained by the passive components of the frame monitors of ATI 80 based on one or more frames sent from a particular legacy network device. ATI 80 has preferably initially set up a basic target descriptor entry containing the IP address and ethernet address of the legacy network device, and also enters the remaining fields of the target descriptor entry corresponding to the legacy network device with other information subsequently obtained from the frame monitors based on subsequent frames issued from legacy network device. Such information may include mail server address, etc. In this manner, a target descriptor entry is generated in target descriptor table 76 corresponding to each discovered legacy network device, such as legacy network printers 15 and 16, on local network 14. The target descriptor entry contains the address information corresponding to each discovered legacy network device and also contains other information related to the identity and functional capabilities of the legacy network device.

In step S1607, ATI 80 notifies other modules in mimic device 20 that a new or modified target descriptor entry has been entered in target descriptor table 76. Preferably, ATI 80 performs this notification by publishing the new or modified target descriptor entry to all modules in mimic device 20 which have previously subscribed with ATI 80 to be notified of such an event. For example, application manager module 78 subscribes to ATI 80 upon initialization of application manager module 78 to receive each target descriptor entry that is created or modified and entered in target descriptor table 76. In this manner, application manager module 78 can be made aware of newly-discovered, or changed, legacy network devices on local network 14 in order to initiate or update the necessary applications which are needed to augment the functional capabilities of the particular legacy network device.

For example, if ATI 80 determines that legacy network printer 15 is a newly-discovered device, then ATI 80 creates a new target descriptor entry after performing discovery and then notifies application manager module 78 of the new target descriptor entry corresponding to legacy network printer 15. In this example, application manager module 78 then initiates the applications which are necessary to augment the functional capabilities of legacy network printer 15 which are determined from device capability table 73. If legacy network printer 15 does not inherently support e-mail printing capabilities, application manager module 78 instructs e-mail printing application module 71 to perform this service for legacy network printer 15 (step S1608). Preferably, each application in mimic device 20 which acts for a given legacy network device opens a socket for receiving frames for that device. The details of this aspect of the invention are discussed further below.

Next, in step S1609, NDM 64 creates a new entry in routing table 74 based on the IP address and ethernet address of the newly-discovered legacy network device, or modifies an entry in routing table 74 in the case that a modification is made in an entry to target descriptor table 76 for a previously identified IP address. In addition, NDM 64 also updates the network drivers to change their default gateways, subnet masks, IP and Ethernet addresses as required. In this manner, when NDM 64 subsequently receives an outgoing frame containing a destination address corresponding to the IP address of the particular legacy network device, NDM 64 will determine based on routing table 74 that the frame should be sent through local network interface card 21 over local network 14 to the legacy network device corresponding to the IP address. After ATI 80 has performed the foregoing steps S1606 to S1609 for each unidentified IP address and each detection of new information obtained from step S1604, flow passes to step S1610.

In step S1610, ATI 80 maintains passive, and some active, observation of local network 14 and external network 10, and maintains target descriptor table 76. Specifically, ATI 80 uses the active component of an ICMP frame monitor to send an ICMP echo request message to each device on local network 14 that has an entry in target descriptor table 76. The ICMP echo request is based on the IP address of the device to which the request is targeted. Of course other active methods can be used to elicit information from the targets to maintain target descriptors in target descriptor table 76. As long as the device continues to respond to the periodic ICMP echo requests, or sends other network traffic, its entry is maintained in target descriptor table 76; otherwise, if the corresponding entry's latest time stamp indicates that the entry is stale, the entry is removed, and the other modules of mimic device 20 are notified so that the extended functionality is discontinued for the device. This functionality is similar to that described above with respect to FIG. 6, and will not be repeated here for the sake of brevity. Flow then passes to return in step S1611.

In the event it is determined from NDM 64 that there has been a disconnect in the physical link of local network 14, then the initial mimic startup state is again entered in which mimic device 20 attempts to search and discovery the legacy network devices on local network 14, as in steps S1606 to S1610.

Figure 7:
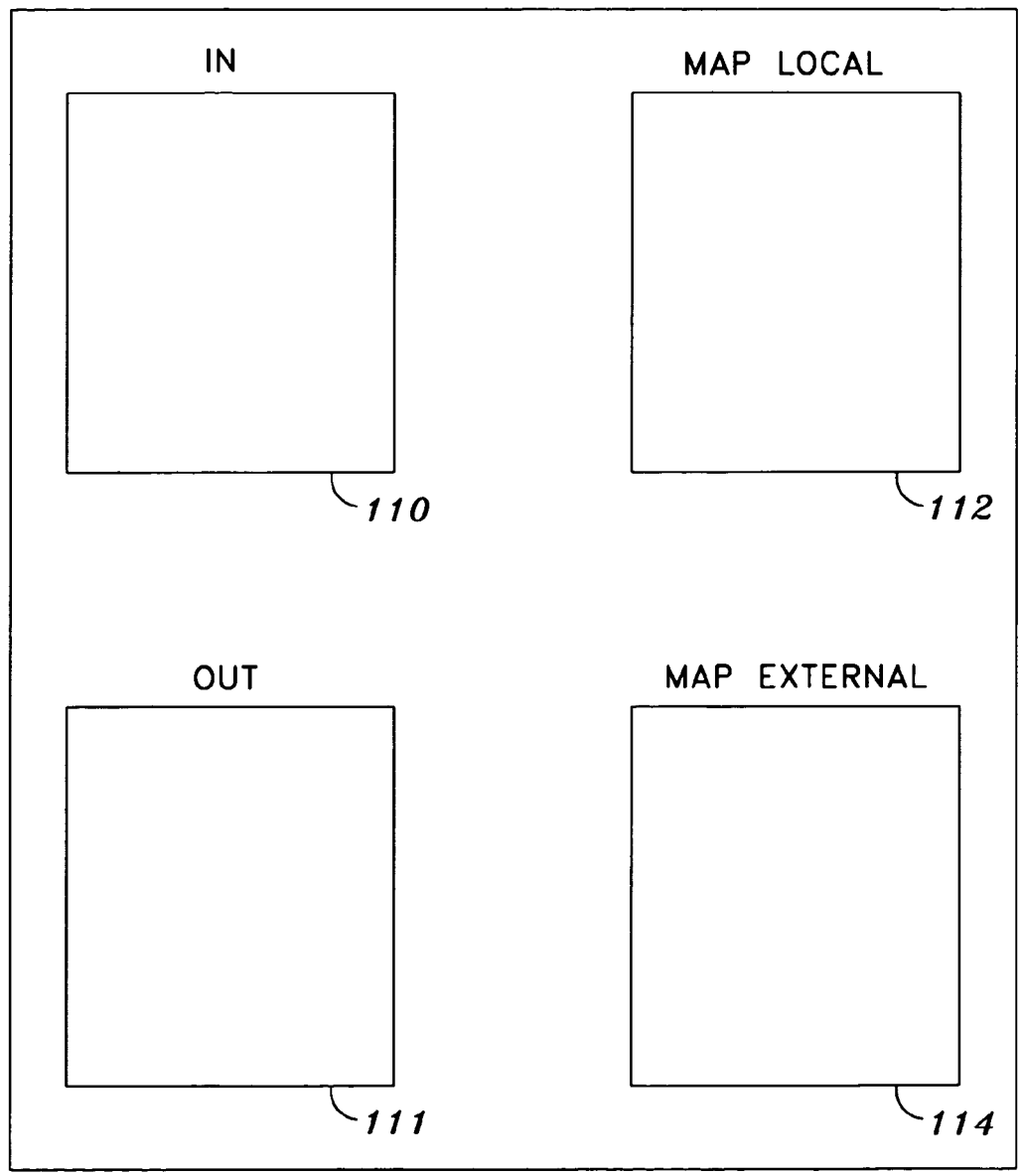
FIG. 7 is a block diagram depicting rules tables according to one embodiment of the present invention.

Regardless of whether passive discovery or active discovery is used, rule tables 75 is utilized to implement the present invention. In this regard, FIG. 7 is a diagram depicting rule tables 75. Rule Tables 75 contains several tables of rules utilized by NTC 65 in processing frames received and sent by mimic device 20. In this embodiment four rule tables are defined in rule tables 75, however additional rule tables may exist in other embodiments. IN table 110 contains rules that are applied to frames by NTC 65 when they are received by mimic device 20. OUT table 111 contains rules that are applied by NTC 65 to frames prior to sending them to NDM 64 to be sent out of mimic device 20. MAP LOCAL table 112 is a sub-table contained within IN table 110, and is utilized by TAT 69 for managing port assignments. MAP EXTERNAL table 114 is a sub-table contained within OUT table 111, and is also utilized by TAT 69 for managing port assignments.

FIG. 8A depicts IN table 110 together with three sample table entries. Each entry defines a rule based on several parameters to be used by NTC 65 in processing frames. The parameter table 120 identifies the table the rule is found on. Possible tables include IN table 110 and OUT table 111, as well as any subtables such as MAP LOCAL table 112. Parameter timeout 121 can provide a time duration, the expiration of which causes the rule to be removed from the table. In the alternative, parameter timeout 121 could be set as STATIC, which provides for the particular rule to remain on the table until a functional module requests its removal.

Each rule is also defined by a set of discriminators (source IP 122, destination IP 124, source port 125 and destination port 126) and an action 128. NTC 65 compares frames against the discriminators, and if a match occurs the designated action 128 is executed. In this embodiment four discriminators are defined: source IP 122, destination IP 124, source port 125 and destination port 126. Source IP 122 and source port 125 may contain the IP address and port number of the source of a frame. Destination IP 124 and destination port 126 may contain the IP address and port number of the destination for a frame. The entries for the discriminators may be either a specific value or address (IP address or port number), a wildcard that matches with all possible values (an asterisk), or a macro which matches with a specific range of possible values ([LOCAL], for example, will find a match with any address detected on local network 14). While this embodiment utilizes four discriminators, additional discriminators such as protocol and source interface of the frame may also be used.

Upon finding a match between a frame and the discriminators of a rule, the designated action 128 is executed. For example, CAPTURE will cause the frame to be captured and submitted for further processing by one of the functional modules, such as PTD 66. BRANCH will cause the frame to be processed using a subtable indicated in the BRANCH action. REDIRECT causes the frame to be sent to one of the application modules within mimic device 20. ACCEPT causes the frame to be passed through mimic device 20 without further processing by mimic device 20. Additional actions may be defined and utilized within mimic device 20 for processing received frames.

FIG. 8B depicts OUT table 111, which is set up in the same manner as IN table 110. The parameters defining each rule entry are the same as described above with respect to FIG. 8A, and are therefore identified with the same designating numbers. Since OUT table 111 is structured in the same manner as IN table 110, a detailed explanation of the structure will be omitted.

Figure 9:
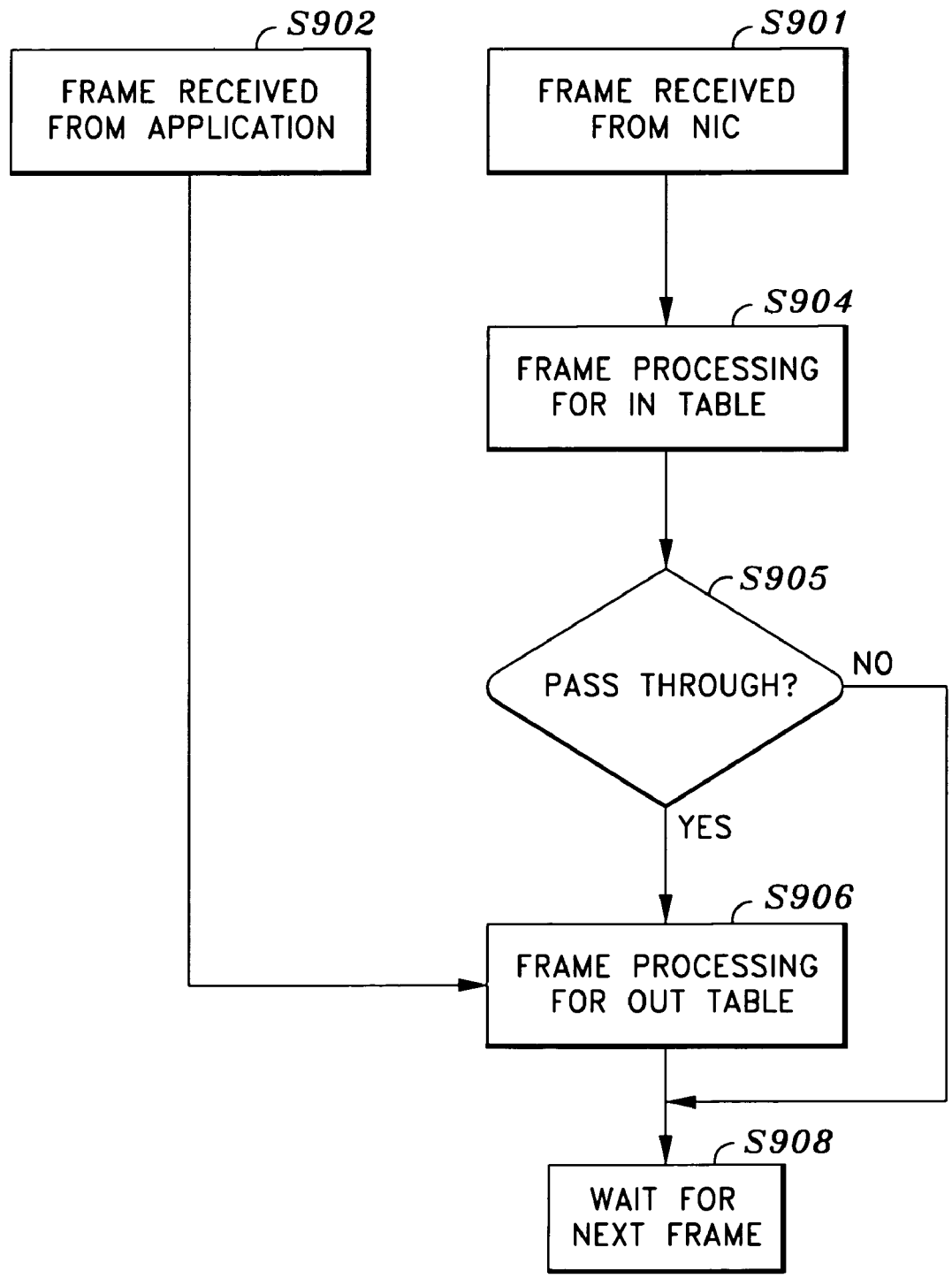
FIG. 9 is a flowchart for explaining the application of a frame to the IN and OUT rules tables depicted in FIGS. 8A and 8B according to one embodiment of the present invention.

FIG. 9 is a flowchart briefly summarizing the processing performed by NTC 65 on frames received by mimic device 20. In step S901, a frame is received by one of the network interfaces such as external network interface 32 or local network interface 31. Upon receiving the message, NDM 64 notifies NTC 65 that the frame is ready for processing. In step S904, the received frame is processed by NTC 65 using the rules contained within IN table 110. If the frame is not dropped or redirected by NTC 65 in applying IN table 110, in step S905 processing of the frame by NTC 65 is shifted and performed in step S906 using the rules contained in OUT table 111. Otherwise, in step S905 processing by NTC 65 is stopped and NTC 65 awaits the next frame in step S908. In step S902, a frame is received by NTC 65 from an application module, such as secure printing application module 70. NTC 65 then proceeds to process the frame using the rules contained within OUT table 111 in step S906. Upon completion of step S906, NTC 65 again waits for the next frame in step S908.

Figure 10:
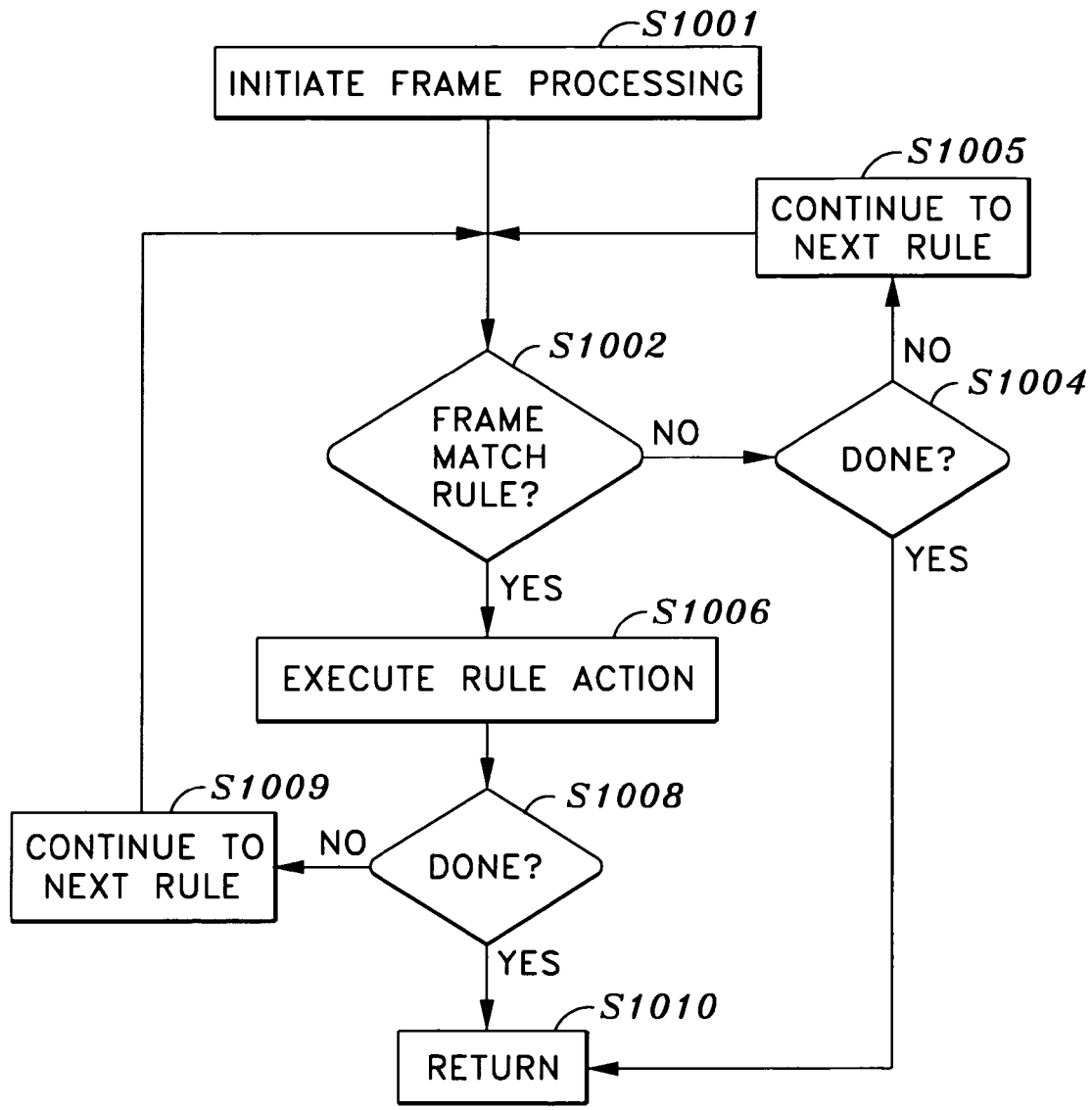
FIG. 10 is a flowchart for explaining the processing of frames according to one embodiment of the present invention.

The description of FIG. 9 above briefly described NTC 65 applying a rule table, such as IN table 110, in processing a frame. FIG. 10 is a flowchart depicting in more detail the process of processing a received frame using rules contained within a particular rule table. In step S1001, NTC 65 initiates processing of the received frame. Typically, initiation occurs when NTC 65 reaches a point in the general processing, such as that depicted in FIG. 9, where a received frame is to be processed using a particular rule table. In step S1002, NTC 65 determines whether the frame matches the discriminators contained within the first rule of the rule table. If these discriminators do not match the frame, in step S1004 it is determined whether NTC 65 is done processing using the rule table. If processing is not done, in step S1005 NTC 65 continues to the next rule in the rule table and returns to step S1002 to determine if the frame matches the discriminators of that rule. However, if NTC 65 is done processing using the rule table, processing is returned to the general processing depicted in FIG. 9 in step S1010.

If NTC 65 determines in step S1002 that the frame does match the discriminators defined in the rule, the action associated with that rule is executed in step S1006. After the action associated with that rule has been executed in step S1006, it is determined in step S1008 whether the processing using the rule table is done. If processing using the rule table is not done, NTC 65 proceeds to the next rule in the rule table in step S1009 and returns to step S1002 to compare the discriminators of that rule with the frame. If processing is complete using the rule table, NTC 65 again returns to general processing in step S1010. Whenever NTC 65 is called upon to process a frame using a particular rule table, NTC 65 traverses the relevant rule table as described above.

FIG. 11 depicts routing Table 74 utilized by NDM 64 in determining which network interface to transmit frames. Each entry in routing Table 74 is defined using several parameters such as destination 140, netmask 141, gateway 142, device 144 and notes 145, which describe the particular entry in the table. The detailed definition and functioning of each of the parameters are well known to those skilled in the art, and therefore are not provided in this description.

Figure 12:
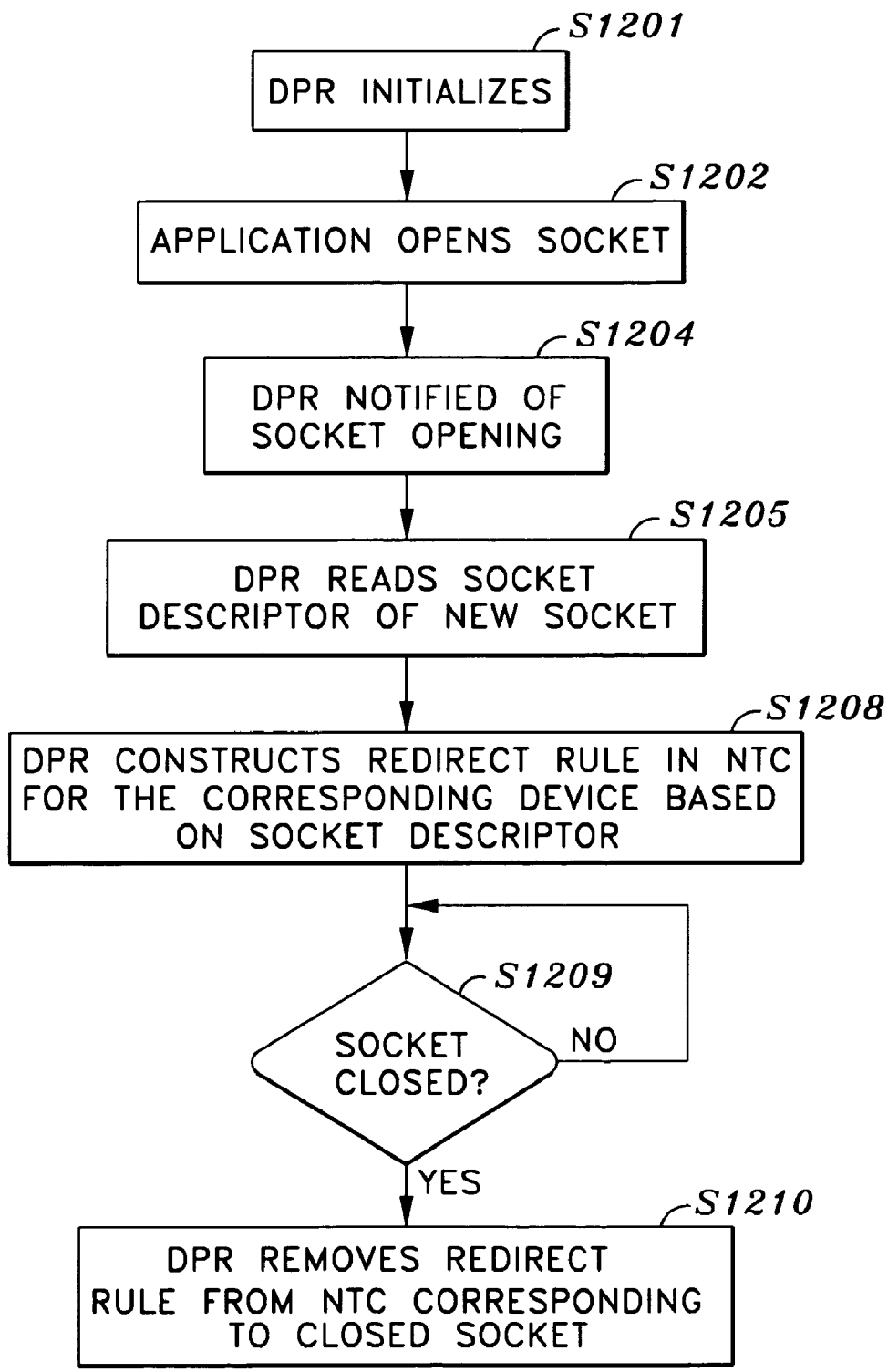
FIG. 12 is a flowchart for explaining dynamic port registration according to one embodiment of the present invention.

FIG. 12 is a flowchart depicting the processing performed by DPR 67. In step S1201, DPR 67 initializes and waits for application modules in mimic device 20 to begin working with sockets. In step S1202 an application such as e-mail printing application module 71, begins executing and creates a socket for communication over the network. When an application opens a socket for communication over the network, a function is called to open the socket. When one of these functions are called, DPR 67 is notified in step S1204 of the socket creation.

When an application opens a socket for communication, an entry is made in socket library 77 containing a socket descriptor for defining the socket opened by the application. In step S1205, DPR 67 reads the socket descriptor from socket library 77 to determine the parameters of the new socket. In step S1208, DPR 67 constructs a redirect rule in NTC 65 based on the socket descriptor corresponding to the new socket. Utilizing this redirect rule, NTC 65 redirects frames received by mimic device 20 to the application running on the mimic device 20 rather than passing the frame through to a device on local network 14.

In step S1209, DPR 67 waits for the socket to be closed. DPR 67 may wait for a function to be called which closes the socket, or in the alternative DPR 67 may wait a specified period of time beginning when the socket is opened. Once the socket has been closed, in step S1210 DPR 67 removes the redirect rule from NTC 65 corresponding to the closed socket. In the manner described above, DPR 67 can ensure that any traffic received from external network 10 is directed to application modules running on mimic device 20 in the case where mimic device 20 is augmenting the capabilities of a device on local network 14.

Figure 13:
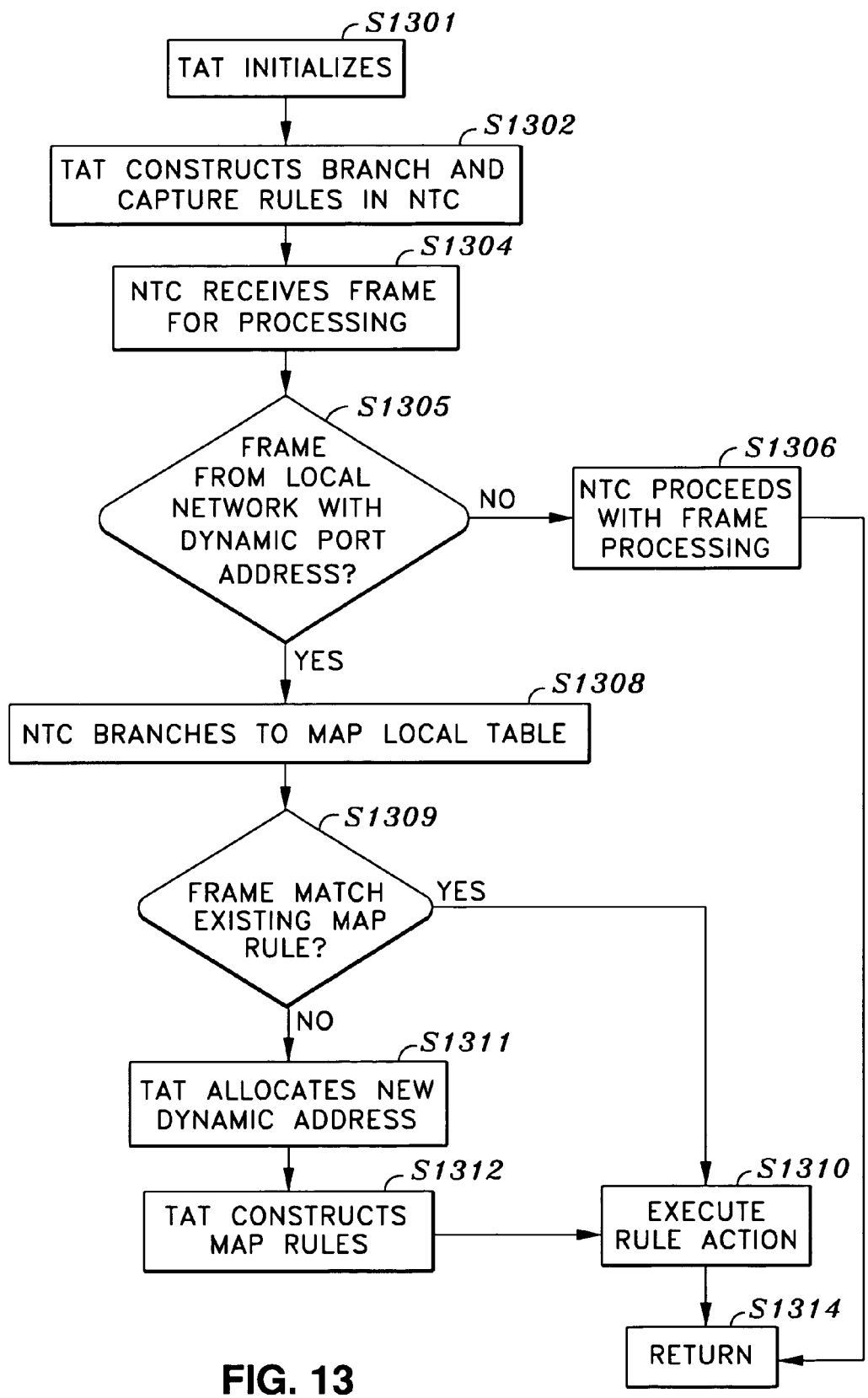
FIG. 13 is a flowchart for explaining the mapping of port identifiers according to one embodiment of the present invention.

FIG. 13 depicts the processing performed by TAT 69. In step S1301, TAT 69 initializes and prepares for processing. In step S1302, TAT 69 constructs branch and capture rules in NTC 65. TAT 69 constructs a branch rule in IN table 110 for directing specific received frames to map local table 112. In addition, TAT 69 constructs a branch rule in OUT table 111 for directing specific frames to map external table 114. Additionally, TAT 69 constructs a capture rule within the map local table 112 to capture specific frames. The capture rule constructed in map local table 112 captures all frames received from devices on local network 14 using a dynamic port address.

In step S1304, NTC 65 receives a frame for processing from NDM 64. In step S1305, it is determined whether the received frame is from the local network and whether it contains a dynamic port address. If it is from the local network and contains a dynamic port address, the branch rule created by TAT 69 branches the frame processing to map local table 112 in step S1308. If the received frame is not from the local network and/or does not contain a dynamic port address, NTC 65 proceeds with normal frame processing in step S1306 and TAT 69 returns to a wait state in step S1314.

As indicated above, NTC 65 branches to map local table 112 in step S1308 when it is determined that the received frame is from a local network with a dynamic port address. In step S1309, NTC 65 traverses map local table 112 and determines whether the frame matches the discriminators of an existing map rule within that table (as well as determining if there is a match with any other rules contained within map local table 112, and executing the rule action for those rules that do match). If there is a match of the discriminators, in step S1310 the map rule is executed and TAT 69 returns to a wait state for the next frame in step S1314. If there is no existing map rule corresponding to the discriminators of the frame, in step S1311 TAT 69 allocates a new dynamic address for that frame.

In assigning the new dynamic address to the frame, TAT 69 may utilize its own internal list of unused port numbers. In the alternative, TAT 69 may create a dummy socket and receive a new port number allocated by the network stack of mimic device 20 and utilize that new dynamic address for the frame being processed. In step S1312, TAT 69 constructs map rules corresponding to the newly assigned dynamic address. In map local table 112, TAT 69 constructs a map rule which maps the existing port address of a frame to the newly allocated port address when a frame is processed containing the original port number. In the map external table 114, TAT 69 constructs a map rule for mapping the newly allocated dynamic address back to the original dynamic port address upon receiving a frame from the external network containing to the new dynamic address. Upon completion of constructing the map rules, the newly created map rule is executed on the present frame being processed in step S1310, and TAT 69 returns to a wait state for the next frame in step S1314.

Preferably, the rules contained within map local table 112 and map external table 114, which are utilized by NTC 65, do not contain terminal actions. Accordingly, TAT 69 processes the frames and then returns processing to NTC 65, thereby transparently performing address translation on frames utilizing dynamic port addresses without interfering with the general processing performed by NTC 65. It should be noted that other sub-tables can be created by any application that requires them. These sub-tables, unlike the sub-tables used by TAT 69, may include terminal actions.

Figure 14:
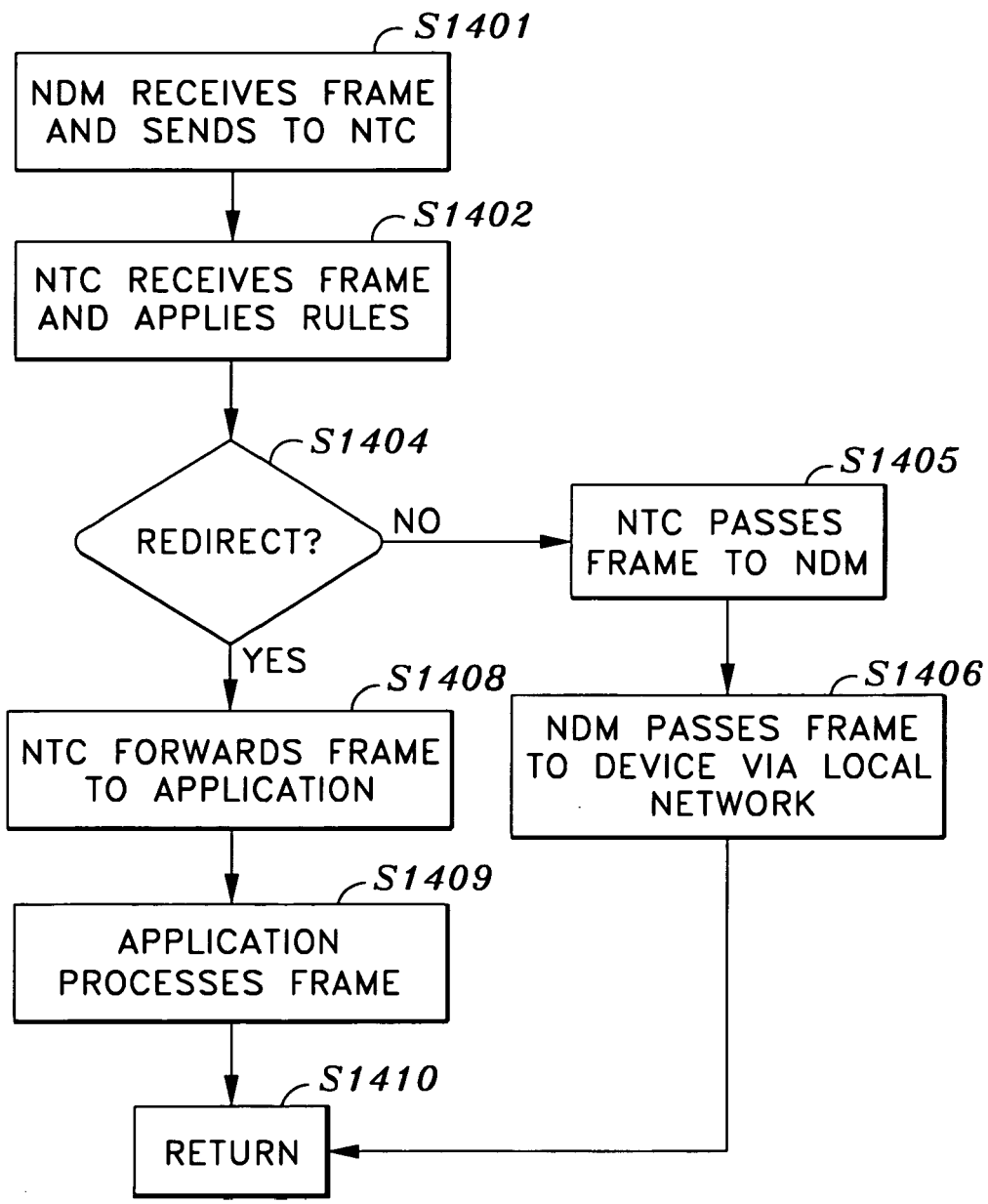
FIG. 14 is a flowchart for explaining the routing of an incoming frame according to one embodiment of the present invention.

FIG. 14 is a flowchart depicting the process mimic device 20 undertakes upon receiving a frame from external network 10. In step S1401, NDM 64 receives a frame from external network 10 and notifies NTC 65 that a frame is available for processing. Upon receiving notification of a received frame, NTC 65 begins processing the frame in step S1402 by applying the frame to the rule tables within rule tables 75 as described using FIG. 9. In applying the frame to rule tables 75, the frame may be passed through or redirected in step S1404 depending on the which rules are applied to the frame by NTC 65 during processing. If the frame is not redirected, NTC 65 passes the frame back to NDM 64 in step S1405 and NDM 64 passes the frame on to the device on the local network as indicated in the frame via the local network interface 31 in step S1406. After the frame is passed through by NDM 64, processing is returned to a wait state in step S1410.

On the other hand, if the rules applied by NTC 65 redirect the frame in step S1404, NTC 65 forwards the frame to the appropriate application module running on mimic device 20 as dictated by the rule action. In step S1409, the application module on mimic device 20 that receives the frame processes the frame. Once processing by the application module is complete, processing is returned to a wait state in step S1410.

Figure 15:
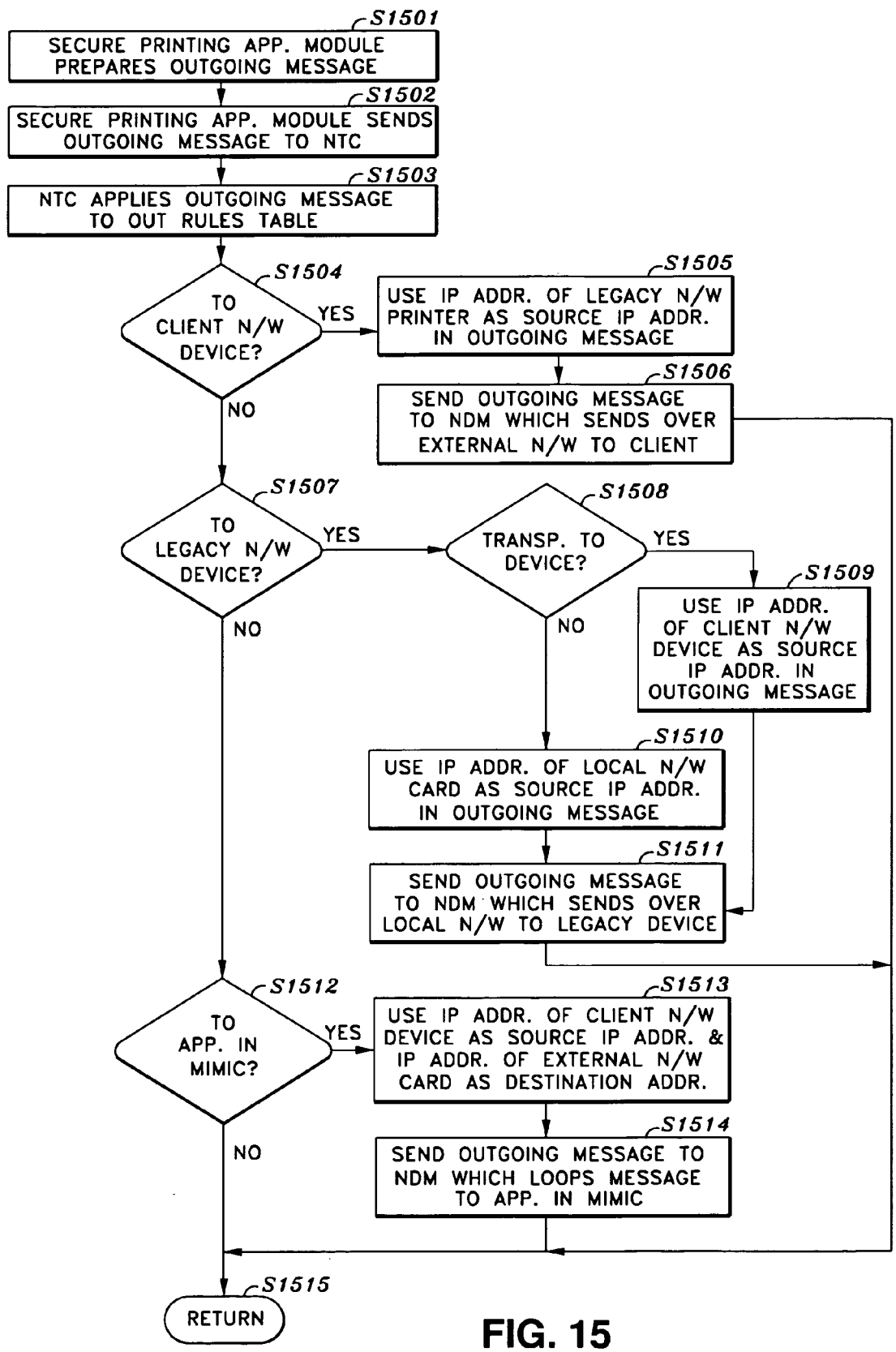
FIG. 15 is a flowchart for explaining the routing of an outgoing frame according to one embodiment of the present invention.

FIG. 15 is a flowchart for explaining how an application in mimic device 20 communicates with a device on either external network 10 or local network 14. For example, if e-mail printing application module 71 is supporting an e-mail printing function for legacy network printer 15, then e-mail printing application module 71 may need to communicate with the requesting client on external network 10, such as workstation 12, and may also need to communicate with legacy network printer 15 on local network 14 in order to spool the print job to legacy network printer 15. Accordingly, network messages prepared by e-mail printing application module 71 need to be addressed appropriately to the desired device on the appropriate network, and the source IP address in the outgoing message must also be set to achieve the desired effect of transparency. The example set forth in the flowchart of FIG. 15 is for an outgoing message from secure printing application module 70.

In step S1501, secure printing application module 70 prepares an outgoing message which may be an acknowledgment message to the requesting client device on external network 10 such as workstation 12, or may be a print spool message to legacy network printer 15. In step S1502, secure printing application module 70 sends the outgoing message to NTC 65. NTC 65 then applies the outgoing message to the out rule table of rules tables 75 in order to determine how the outgoing message should be addressed (step S1503). In step S1504, it is determined based on the out rule table whether the outgoing message is directed to the requesting client network device. If so, flow passes to step S1505 in which the IP address of the corresponding legacy network printer which secure printing application module 70 is acting for is used as the source IP address in the outgoing message. In this manner, the existence of mimic device 20 will be made transparent to the requesting client network device because the source IP address in the acknowledgment message received by the requesting client network device contains the source IP address of the legacy network printer which is performing the requested printing function. Next, after step S1505, the outgoing message is sent to NDM 64 which utilizes routing table 74 to determine that the outgoing message must be sent through external network interface card 22 over external network 10 to the requesting client network device, such as workstation 12 (step S1506). Flow then passes to return in step S1515.

If it is determined in step S1504 that the outgoing message from secure printing application module 70 is not directed to the requesting client network device, then flow passes to step S1507 in which it is determined whether the outgoing message is directed to the legacy network device, such as legacy network printer 15, which secure printing application module 70 is acting for. If it is determined in step S1507 that the outgoing message is directed to the corresponding legacy network device, then flow passes to step S1508 in which it is determined whether the outgoing message needs to be transparent to the legacy network device. In other words, it is determined whether the source IP address in the outgoing message should contain the IP address of the requesting client network device so that the legacy network device on local network 14 believes it is receiving a message directly from the requesting client network device instead of from mimic device 20. If it is determined in step S1508 that the outgoing message should be transparent to the legacy network device, flow passes to step S1509 in which the IP address of the requesting client network device is used as the source IP address in the outgoing message to the legacy network device. In such a case, flow then passes to step S1511 in which the outgoing message is sent to the NDM which utilizes routing table 74 to determine that the outgoing message should be sent via local network interface card 21 over local network 14 to the corresponding legacy network device. Flow then passes to return in step S1515.

If it is determined in step S1508 that it is not necessary for the outgoing message to be transparent to the legacy network device, then flow passes to step S1510 in which the IP address of local network interface card 21 is used as the source IP address in the outgoing message. As mentioned above, local network interface card 21 is preferably assigned a pre-registered IP address in order to avoid conflicts with any other device, either on local network 14 or on external network 10. It should be noted that even if more than one mimic device is present on external network 10, each mimic device can use the same preset IP address for communicating over its respective local network because each local network is isolated from external network 10 and therefore IP address conflicts are avoided. In this manner, each mimic device does not require a separate IP address to be assigned to it by the network administrator, thereby saving valuable IP addresses for other devices on external network 10. After step S1510, flow then passes to step S1511 in which the outgoing message is sent to NDM 64 which utilizes routing table 74 and sends the outgoing message through local network interface card 21 over local network 14 to the corresponding legacy network device, such as legacy network printer 15. Flow then passes to return in step S1515.

If it is determined in step S1507 that the outgoing message is not directed to the corresponding legacy network device, then flow passes to step S1512 in which it is determined whether the outgoing message is directed to another application residing in mimic device 20. For example, a request from a client network device on external network 10, such as workstation 12, may be a request for e-mail printing of a secure print job on legacy network printer 15. In such a case, the print job would require the services of e-mail printing application module 71 and secure printing application module 70. Accordingly, e-mail printing application module 71 would need to communicate with secure printing application module 70 to complete the decrypted e-mail print job prior to sending it to legacy network printer 15 for printing. Accordingly, an outgoing message from one of the aforementioned applications would be prepared and then handled within mimic device 20 such that it is sent back up to the other desired application for processing. Specifically, if it is determined that the outgoing message is directed to another application in mimic device 20, then flow passes to step S1513 in which the destination IP address of the outgoing message is set to the IP address of external network interface card 22 and the source IP address of the outgoing message is set to the IP address of the requesting client network device. In this manner, the destination IP address having a value corresponding to external network interface card 22 informs NDM 64 in conjunction with routing table 74 that the outgoing message is to be contained within mimic device 20. In addition, the source IP address in the outgoing message having the value of the requesting client network device allows the outgoing message to have transparency such that the receiving application within mimic device 20, such as e-mail printing application module 71, will believe that it received the message directly from the requesting client network device.

After step S1513, flow passes to step S1514 in which the outgoing message is sent to NDM 64 which consults routing table 74 and then, based on the destination IP address in the outgoing message having the value of external network interface card 22, loops the outgoing message back up to NTC 65 which in turn directs the outgoing message up to the desired application, such as e-mail printing application module 71. In this regard, it should be further explained that the outgoing message contains a port identifier corresponding to the desired destination application so that NTC 65 will be able to direct the outgoing message to the desired application in mimic device 20. For example, the outgoing message may request the services of e-mail printing and therefore it will have a port identifier within the outgoing message corresponding to e-mail printing application module 71. Accordingly, when the outgoing message is looped back from NDM 64 to NTC 65 as discussed above, NTC 65 will know that the outgoing message is directed to e-mail printing application module 71. After step S1514, flow passes to return in step S1515.

In another aspect of the invention, additional features are provided to allow for reduced need for configuration and/or setup on the part of a user or a system administrator to implement the invention, and to allow for reduction in potential IP address conflicts and port connection conflicts.

In one such feature, the invention determines a specific IP address for the local side of mimic device 20 in order for mimic device 20 to communicate with target legacy network devices on local network 14. In addition, port mapping techniques are used to avoid communication conflicts between devices on external network 10, mimic device 20, and legacy network devices on local network 14.

Figure 18:
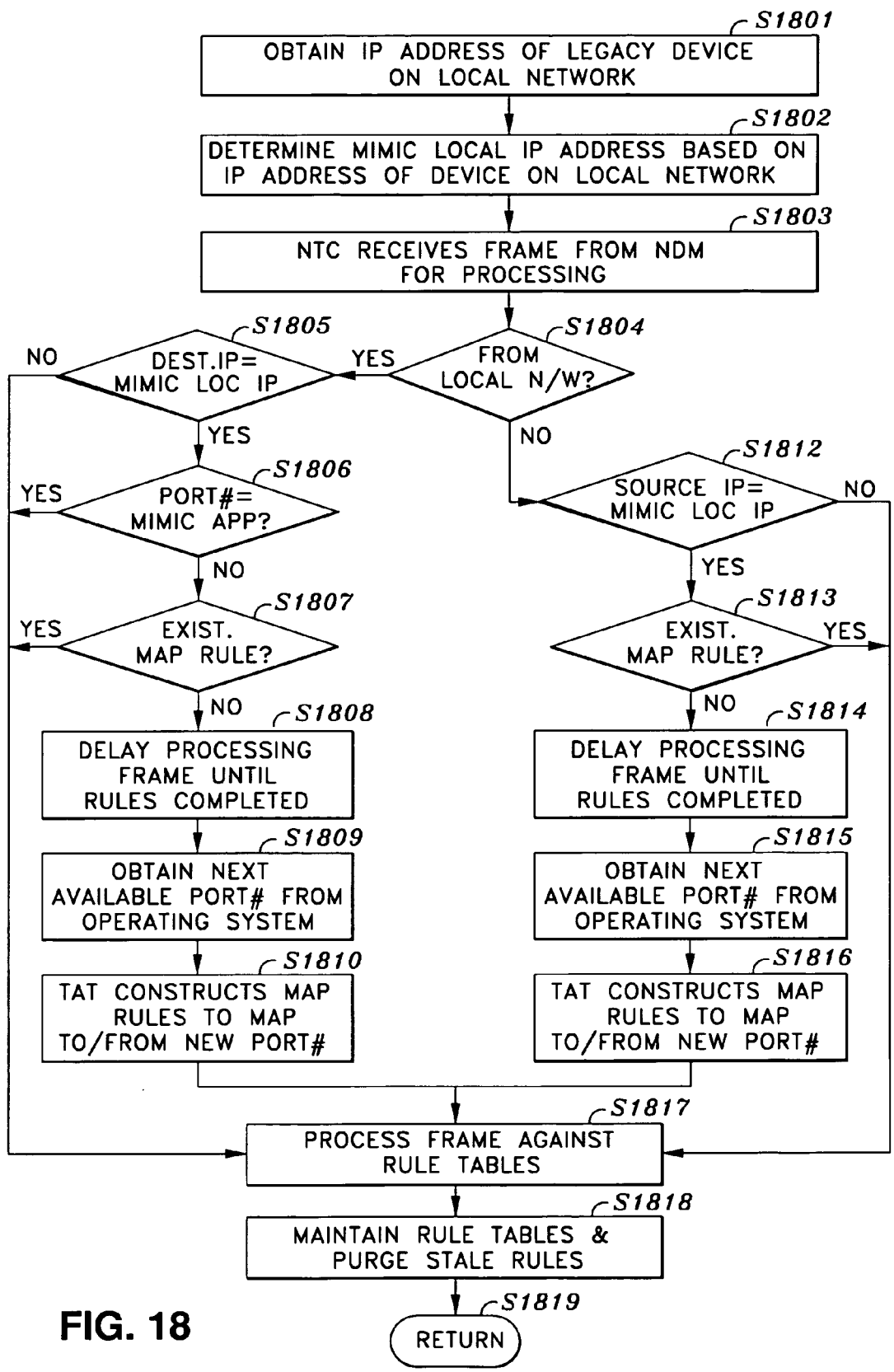
FIG. 18 is a flowchart for explaining mimic local address resolution and conflict avoidance according to another embodiment of the present invention.

FIG. 18 is a flowchart which explains the aforementioned feature of determining an IP address for the local side of mimic device 20, and using port mapping techniques for conflict avoidance. In step S1801, mimic device 20 obtains the IP address of a target legacy network device on local network 14. The IP address is obtained through one of the discovery techniques discussed above with respect to FIGS. 5, 16 and 17. Next, an IP address for assigning to local network interface card 21 on mimic device 20 is determined by subtracting "1" from the IP address of the legacy network device obtained in step S1801.

In general, we pick the local IP address for mimic device 20 so that a target legacy network device can communicate with applications running on mimic device 20. Otherwise, the target legacy network device would have to set its default router address through some other means in order to communicate with mimic device 20. By blending mimic device 20 into the network, we avoid this restriction.

Selecting an IP address for local network interface card 21 that is one less than that of the detected target legacy network device ensures that the picked address is always within the target's subnet. That is because legal subnet masks always set contiguous bits starting with the most significant bit. Though picking an IP address that is one step below that of the target works in most cases, an exception must be made if the target's IP address is xxx.xxx.xxx.1. In this case it is acceptable to pick an IP address that is one address immediately above that of the target, which is xxx.xxx.xxx.2. This method is safe because the smallest possible meaningful subnet has at least two hosts in it. The mask for such a subnet would be 255.255.255.252. Host 00(binary) often has a special meaning and so is rarely used. Host 01 and 10 are valid entities, and Host 11 is the subnet broadcast address.

Of course, since the selected IP address for the local side of mimic device 20 has been borrowed, mimic device 20 should take steps to determine if another device on external network 10 has the same IP address. Accordingly, mimic device 20 actively and passively monitors for the presence of a host device on external network 10 that was legally assigned the IP address which has been borrowed for the local side of mimic device 20. If such a host device is detected, its Ethernet address is adopted for local network interface card 21, and the cache on the target legacy network device is updated by having local network interface card 21 issue a self-ARP (or gratuitous ARP) message on local network 14. In this manner, mimic device 20 tells "the world" that the Ethernet address associated with the IP address in its ARP cache has changed. Otherwise, that host with the same IP address could not interact with the target legacy network device. The active component used for this purpose is an ARP monitor on the external side of mimic device 20. The ARP monitor also looks for seed IP on the external side at initialization, and extracts the IP/Ethernet pair from frames on the local side when detecting target legacy network devices. The passive IP frame monitor can't perform this function because ARP rides over Ethernet and is not a payload of the IP protocol.

The remaining steps of FIG. 18 explain how received frames are processed in two special circumstances when a device on external network 10 has the same IP address as that of local network interface card 21, and when the target legacy network device sends a frame containing a destination IP address equal to the IP address of local network interface card 21. In both circumstances, special handling is required to take into account the potential for conflict due to the possibility that a host device on external network 10 and local network interface card 21 have the same IP address.

In such a case, confusion arises in properly routing frames through mimic device 20 because it is not readily apparent whether a frame from the target legacy network device is really intended to be directed to the host device on external network 10, or is intended to be directed to an application in mimic device 20. This problem is solved by using port numbers as a tag to determined which frames should be directed to/from the legacy network device.

If a frame is to be redirected, an appropriate redirect rule was previously created when the user application on mimic device 20 created the socket having the port number in question. If the frame is not to be redirected, then mimic device 20 passes it through. The problem is that there are two independent entities (mimic device 20 and a target legacy network device) working in the same transport address space. In order to track which frames really came form the target legacy network device, they must be tagged. The only way to tag them is to replace the source port number with a port number that will not be used by an application in mimic device 20. This is guaranteed by asking the operating system for a port number in the same way that sockets normally do. Because a port number is obtained that is guaranteed to be unique by the operating system, the port number can be used to positively identify the replies when they come back. In this way we are using the layer three address of the frame as both an address and as a unique tag. Certain protocols have unusual conventions regarding port numbers, but the mapping of these port numbers generally doesn't impact them.

In addition, confusion also arises in the aforementioned situation because the host device on external network 10 might try to open a connection with the target legacy network device using a source port number that is used by an application in mimic device 20. In such a case, it is not possible to tell if a reply frame from the target legacy network device is intended for the host device on external network 10 which has the same IP address as the local side of mimic device 20, or if the reply frame is intended for the application in mimic device 20 which is using the same port number. This problem is solved by port mapping the source port number in the frames from the host device having the same IP address as that of local network interface card 21 to a new port number to enable appropriate frame tracking for proper routing.

It should be noted that there is no confusion in the case where two arbitrary hosts on external network 10 pick the same port ID. This is because both IP/Port pairs are used by the IP stack in mimic device 20 to fully identify a packet. The confusion discussed above arises because both mimic device 20 and the target legacy network device are independently using the same IP address space and there is no way to prevent that. Because they also have the same IP address, the returning packets can't be easily routed when they're both talking to the same port on an external host unless the packets are marked. The only way to mark them is to assign a specific value to the port that the target uses. The problem is that the target is preexisting and can't necessarily be made to do anything by mimic device 20. This is where transport address translation (TAT) is applied. All frames to and from the target legacy network device go through mimic device 20, so mimic device 20 can tag the frame headers with a unique port number, update the checksums and forward the frame. It can then undo the tag so that the change is transparent to both parties.

Returning to FIG. 18, NTC 65 receives a frame from NDM 64 for processing (step S1803). In step S1804, it is determined whether the frame is received from local network 14, and if so, flow passes to step S1805 which begins processing to port map the source port number in frames from legacy network devices on local network 14 having a destination IP address equal to that of local network interface card 21. If it is determined in step S1804 that the frame is not received from local network 14, then it was received from external network 10 and so flow passes to step S1812 which begins processing to port map the source port number in frames from a host device on external network 10 having the same IP address.

In step S1805, it is determined if the destination IP address in the frame received from local network 14 is the same as the IP address of local network interface card 21. If not, flow passes to step S1817 for normal processing of the frame against the rule tables. If the destination IP address in the frame is the same as the IP address of local network interface card 21, then flow passes to step S1806. In step S1806, it is determined if the frame contains a source port number equal to a port number which is used by an application in mimic device 20. If so, flow passes to step S1817 for normal processing of the frame against the rule tables.

If the frame does not contain a source port number equal to a port number which is used by an application in mimic device 20, then flow passes to step S1807 in which it is determined if a port map rule already exists for the source port number in the frame. If so, then mimic device 20 has previously detected the use of the source port number by the target legacy network device, and has already generated a port mapping rule for that source port number, so flow passes to step S1817 for normal processing of the frame against the rule tables. If a port map rule does not exist for the source port number, then flow passes to step S1808 in which processing of the frame is delayed until a port mapping rule can be generated and implemented in mimic device 20. This prevents the frame from being processed too soon and passing through to the destination device on external network 10 without being port mapped. Flow then passes to step S1809 in which DPR 67 obtains a next available port number from the operating system.

In step S1810 TAT 69 constructs map rules for mapping between the source port number of the frame and the newly-obtained port number. In this regard, rules are established in "IN" and "OUT" rule tables 110 and 111 for mapping the source port numbers in frames from the legacy network devices, and for mapping back the destination port numbers in frames from external network 10 which are directed to the legacy network devices. The reciprocal map rules are placed in map local table 112 and map external table 114. The use of the port mapping rules allows mimic device 20 to determine whether a frame from a legacy device is to be routed to a port opened by an application in mimic device, or is to be routed to a host device on external network 10. The reciprocal port mapping rules within mimic device 20 are transparent to a host device on external network 10 and therefore reduce the possibility of disruption in a connection between the host device and a legacy network device on local network 14. When a port number is mapped in a frame, the checksum of the frame is also updated to reflect the new port number. Otherwise, the frame would not be accepted as valid at its destination.

After creation of the port mapping rules, flow passes to step S1817 in which the frame is processed in accordance with the rules in the rule tables, thereby resulting in mapping of the source port number in the frame to a new source port number, and in subsequent mapping of the destination port number in corresponding reply frames from the device on external network 10 which is at the other end of the port connection transaction.

Returning to step S1804, if it is determined that the frame is not received from local network 14, then flow passes to step S1812 in which it is determined if the source IP address in the frame received from local network 14 is the same as the IP address of local network interface card 21. If not, flow passes to step S1817 for normal processing of the frame against the rule tables. If the source IP address in the frame is the same as the IP address of local network interface card 21, then flow passes to step S1813. In step S1813, it is determined if a port map rule already exists for the source port number in the frame. If so, then mimic device 20 has previously detected the use of the source port number by the host device on external network 10, and has already generated a port mapping rule for that source port number and host device, so flow passes to step S1817 for normal processing of the frame against the rule tables. If a port map rule does not exist for the source port number, then flow passes to step S1814 in which processing of the frame is delayed until a port mapping rule can be generated and implemented in mimic device 20. This prevents the frame from being processed to soon and passing through to the legacy network device on local network 14 without being port mapped. Flow then passes to step S1815 in which DPR 67 obtains a next available port number from the operating system.

In step S1816, TAT 69 constructs map rules for mapping between the source port number of the frame and the newly-obtained port number. In this regard, rules are established in "IN" and "OUT" rule tables 110 and 111 for mapping the source port numbers in frames from the host device on external network 10, and for mapping back the destination port numbers in reply frames from the legacy network device on local network 14 which are directed to the host device. The reciprocal map rules are placed in map local table 112 and map external table 114. The use of the port mapping rules allows mimic device 20 to determine whether a reply frame from a legacy network device is to be routed to a port opened by an application in mimic device, or is to be routed to a host device on external network 10. The reciprocal port mapping rules within mimic device 20 are transparent to the host device and therefore reduce the possibility of disruption in a connection between the host device and legacy network device.

After creation of the port mapping rules, flow passes to step S1817 in which the frame is processed in accordance with the rules in the rule tables, thereby resulting in mapping of the source port number in the frame, from the host device on external network 10 to a new source port number, and resulting in subsequent mapping of the destination port number in corresponding reply frames from the legacy network device on local network 14 which is at the other end of the port connection transaction.

Flow then passes to step S1818 in which the rules tables are maintained by purging stale rules from the rule tables. For example, each time a rule is used it is time stamped, and if a predetermined amount of time has passed since the rule was last used, it is declared stale and is deleted. This would happen when a port connection between a host device on external network 10 and a legacy network device on local network 14 is no longer in use. One possible predetermined amount of time might be two and one-half hours, so as to accommodate protocols which allow connections to be left open for a long time without activity. In this manner unnecessary rules are removed to free up memory resources and to streamline processing of frames against the rule tables. Flow then passes to return in step S1819.

Figure 19:
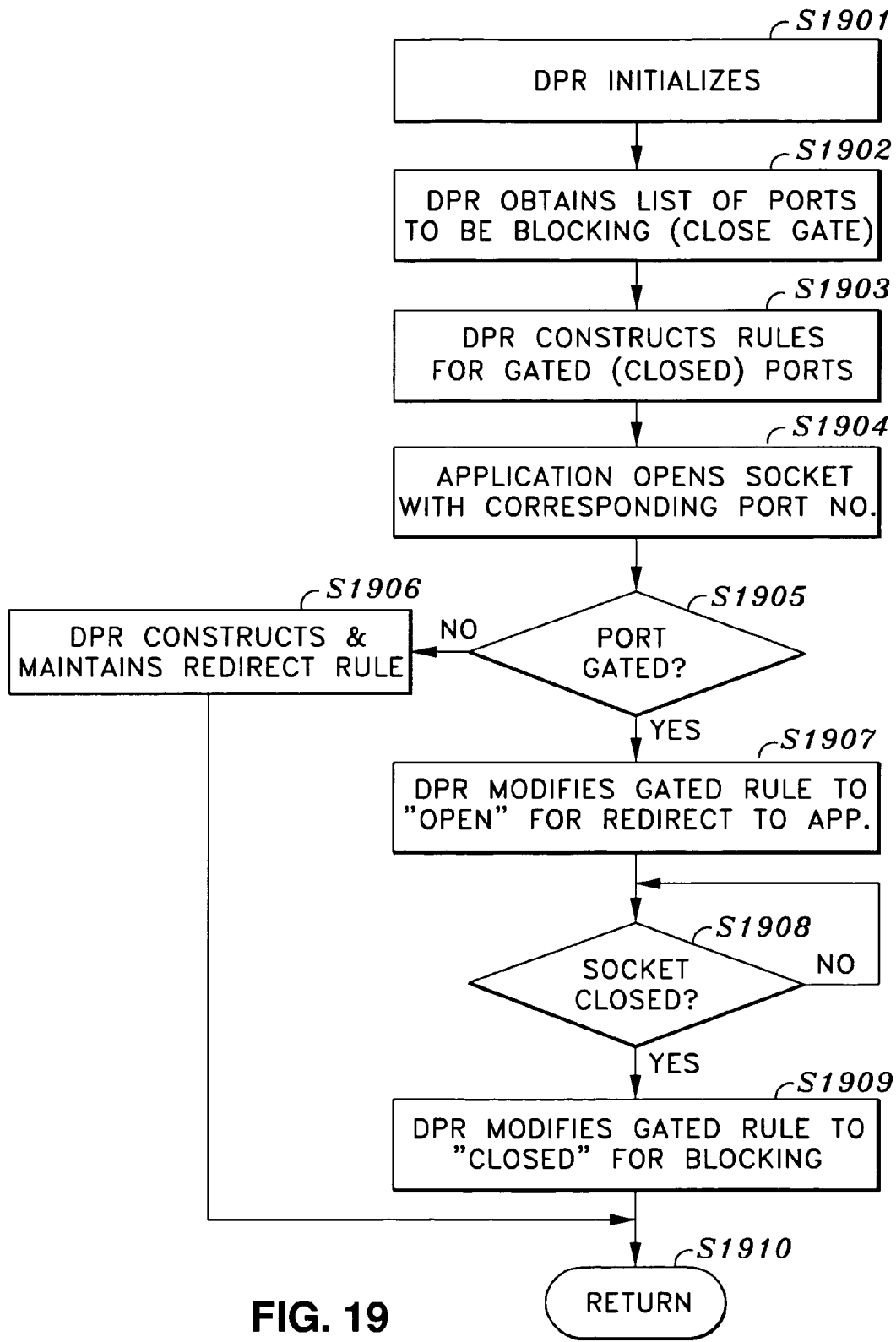
FIG. 19 is a flowchart for explaining dynamic port gating according to another embodiment of the present invention.

FIG. 19 depicts another feature of the invention which provides for dynamic changes in the way that frame messages are routed by mimic device 20. In particular, it was explained above how rules are created after search and discovery of target legacy network devices on local network 14, and how rules are dynamically created in response to special situations such as those depicted in FIG. 18. In addition, the present invention provides the ability for applications in mimic device 20 to dynamically change the routing rules for frame messages containing a particular destination port number. This technique is referred herein as dynamic gating.

For example, mimic device 20 may host an application which provides a service that uses a particular port number. The use of the service may result in the target legacy network device to be entered into an undesirable state at the wrong time. Accordingly, a set of rules can be established which block frame messages from being directed to a, corresponding list of port numbers used by applications in mimic device 20. The list of port numbers can be provided by a user prior to initialization of mimic device 20. Then, at some subsequent time during active operation of mimic device 20, one or more of the applications in mimic device 20 may have a need to execute for the target legacy network device.

In such a case, the application opens its corresponding port number like normal, and then mimic device 20 detects the use of the port number and modifies the corresponding block rule into a redirect rule. In this manner, applications open ports in a normal fashion without needing an underlying knowledge of the rules in mimic device 20. In addition, rules are dynamically modified by mimic device 20 when necessary to support applications hosted on mimic device 20.

Turning to FIG. 19, DPR 67 initializes, which is typically at initialization of mimic device 20, or at a power cycle. In step S1902, DPR 67 obtains a static list of ports to be blocked, which is preferably a user supplied list input to mimic device 20. Next, in step S1903, DPR 67 constructs gate rules for blocking the routing of frame messages to the corresponding ports in the static list, thereby preventing frame messages containing those destination ports from reaching the corresponding applications in mimic device 20. The gate rules are implemented in IN and OUT rule tables 110 and 111. In step S1904, an application hosted in mimic device 20 executes and opens a socket with a port number, and DPR 67 detects the socket opening.

It is determined in step S1905 whether the port number used by the application in step S1904 has a corresponding gate rule in the rule tables. If not, flow passes to step S1906 in which DPR 67 constructs and implements a redirect rule for the opened socket based on the port number in the normal fashion, after which flow passes to return in step S1910. If it is determined in step S1905 that the port number used by the application in step S1904 does have a corresponding gate rule, then flow passes to step S1907. DPR 67 accesses and modifies the gate rule corresponding to the port number by changing it from the "block" state to an "open" state. In the "open" state, the gate rule acts as a redirect rule in which frame messages containing the given port number as a destination port number are directed to the application in mimic device 20, instead of being directed to the target-legacy network device.

In step S1908, it is determined if the socket opened by the application in step S1904 has been closed. If not, flow loops back to step S1908 until the socket has been closed. Upon closing of the socket, flow passes to step S1909 in which DPR 67 again accesses and modifies the gate rule corresponding to the port number of the socket, and modifies the gate rule to be a "blocked" rule instead of an "open" rule. The rule therefore once again blocks frame messages containing the given port number as a destination port number from being directed to the corresponding application in mimic device 20. Flow then passes to return in step S1910.

The dynamic gating scenario depicted in FIG. 19 is just one scenario that can be implemented using the dynamic control of gate rules according to this embodiment of the invention. Of course, it should be appreciated that other scenarios can be implemented to dynamically change the routing of frame messages by mimic device 20 for use by applications in mimic device 20, or for control of message routing to/from legacy network devices on local network 14 and to/from devices on external network 10.

Figure 20:
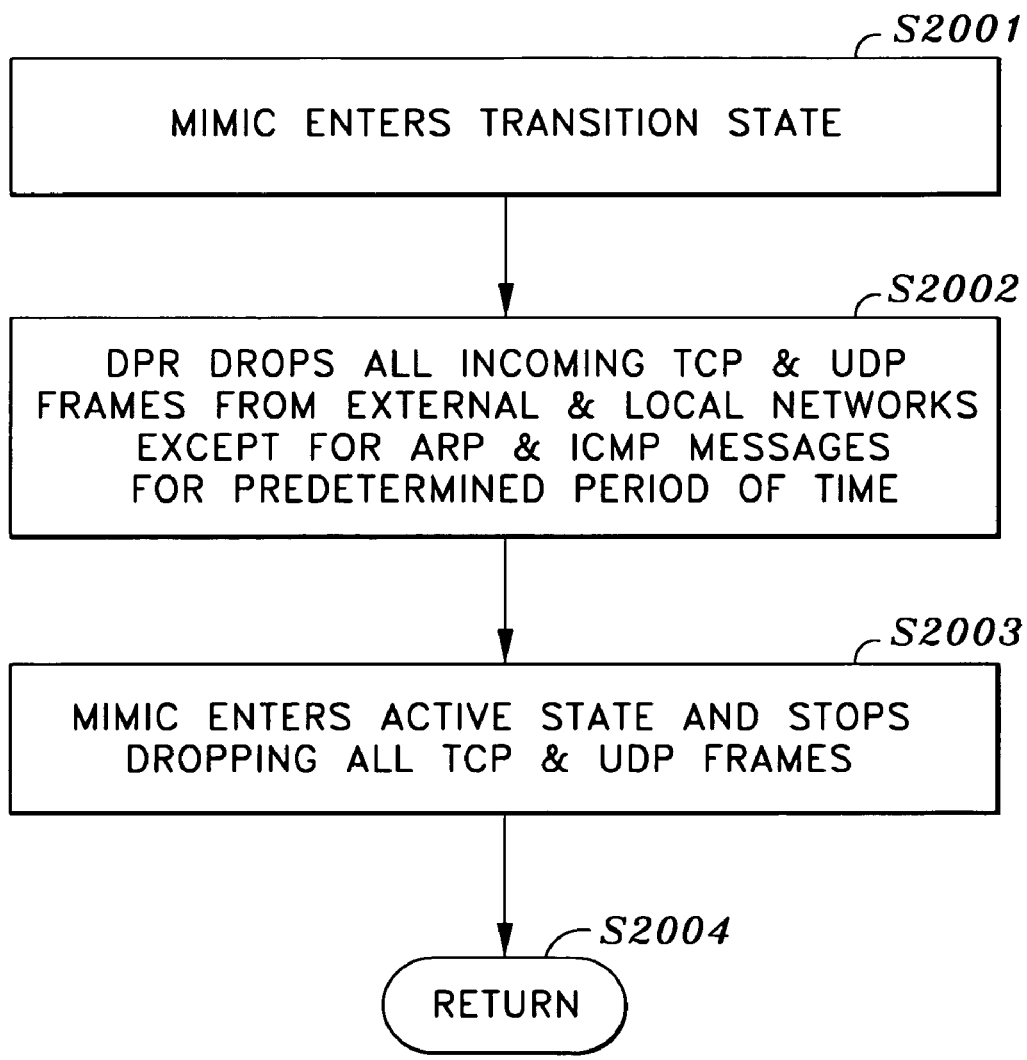
FIG. 20 is a flowchart for explaining transition state use of the dynamic port gating shown in FIG. 19.

FIG. 20 depicts a transition state of mimic device 20 in which mimic device 20 has just been installed and powered up. In general, when mimic device 20 has completed search and discovery of target legacy network devices as discussed above, and has created appropriate rules for extending the functional capabilities of the legacy network devices, the mimic device then transitions to an active state in which it actively operates for the legacy network devices. During this transition period, there may be a connection request in progress from a host device on external network 10 to a legacy network device on local network 14. In such a case, it is preferable to drop all messages by mimic device 20 so that no messages are exchanged between devices on local network 14 and devices on external network 10, until the time that mimic device 20 is in an active state and ready to process the messages as needed. Of course, this procedure may disrupt connections, or prevent connections from being established directly with the legacy network device. However, when mimic device 20 comes online in active state, it will intercept a repeat connection request, and will then either establish the connection through the use of port mapping rules, or through redirect rules if an application in mimic device 20 is to use the port connection, or it will simply pass the connection request through to the legacy network device.

First, in step S2001, mimic enters the transition state after search and discovery of the legacy network devices on local network 14. Of course, the mimic device 20 is interested in TCP and UDP messages, and so lets other messages pass through mimic device 20 during the transition state. Accordingly, in step S2002, DPR 67 drops all incoming TCP and UDP messages from both local network 14 and external network 10 while mimic device 20 is in the transition state, except for ARP and ICMP messages. ARP messages are always duplicated on the local side in order to keep the cache of each legacy network device updated as to the physical address of other devices on external network 10. ICMP messages are generally monitored and copied to local network 14, and ICMP queries are generally forwarded through to local network 14.

Next, in step S2003, mimic device 20 enters the active state in which it is now operational to act for legacy network devices on local network 14, and to process incoming messages according to rules. Accordingly, mimic device 20 stops dropping all TCP and UDP messages as directed in step S2002. Flow then passes to return in step S2009.

FIG. 21 provides a table which represents logic for explaining application of dynamic rules depending on a particular scenario when processing a particular frame received by mimic device 20. The dynamic rules contained in rules table 75 are set up to prevent IP conflicts that might occur if a host device on external network 10 has the same IP address as that of local network interface card 21 on mimic device 20. Thus, there are four basic rule sets based on the combinations of whether a frame is received by mimic device 20 from local network 14 or external network 10, and on whether the frame concerns a host device on external network 10 that has the same IP address as the local side of mimic device 20. These four rule sets are duplicated into eight rule sets because both TCP and UDP protocols have identical but independent and distinct address ranges.

The aforementioned eight rule sets are depicted in table 160 of FIG. 21. As seen in table 160, the first column "Local IP Check" 162 describes whether the frame concerns a host device on external network 10 that has the same IP address as the local side of mimic device 20. The first two rows in "Local IP Check" 162 correspond to frames that do not concern a host device on external network 10 that has the same IP address as the local side of mimic device 20. The last two rows in "Local IP Check" 162 correspond to frames that do concern a host device on external network 10 that has the same IP address as the local side of mimic device 20.

The columns in table 160 corresponding to Lcl 162 and Ext 163 concern whether the frame is received on by external network interface card 22 or local network interface card 21. The columns in table 160 corresponding to UDP 164 and TCP 165 concern whether the frame is a UDP frame or a TCP frame. The column for "Name" 166 provides a particular name for each of the eight rule sets, and the column for ID 167 provides a particular ID code for each of the eight rule sets. Accordingly, there is a unique rule set identified for each combination of factors based on the IP address of the host device involved in the frame, the network on which mimic device 20 received the frame, and the protocol type of the frame. In this manner, the dynamic rules can be organized for efficient and proper routing of messages by mimic device 20 in a manner which avoids IP address conflicts and unwanted routing.

Figure 22A:
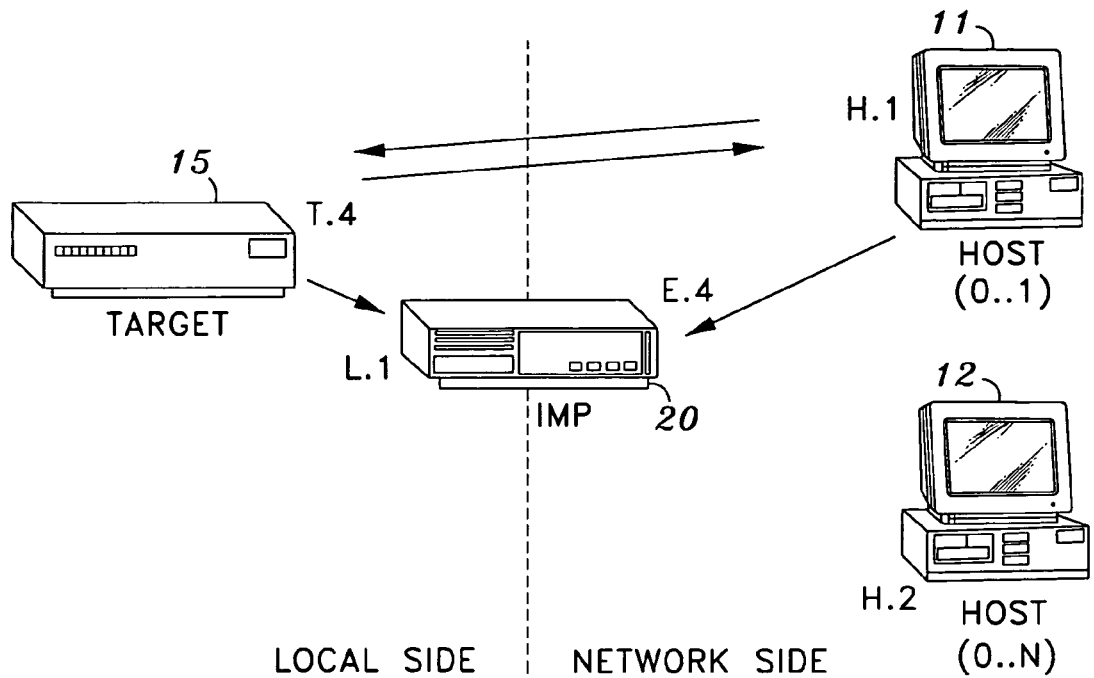
FIGS. 22A and 22B are block diagrams for explaining network communication scenarios according to the present invention.
Figure 22B:
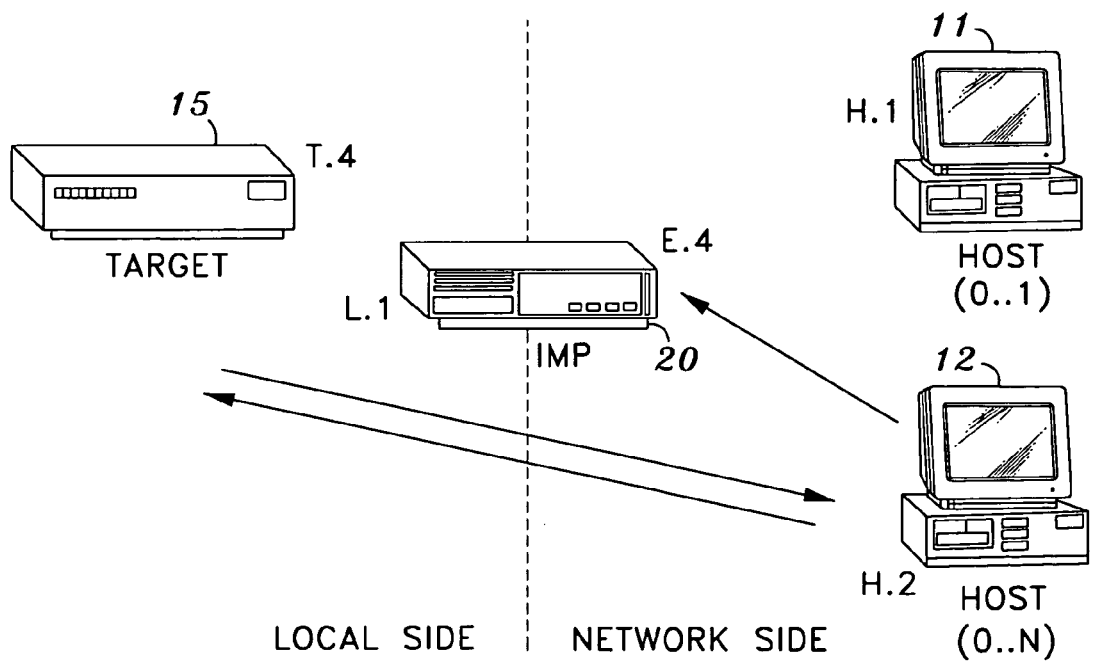

FIGS. 22A and 22B are block diagrams which depict the two different scenarios depending on whether a given network communication involves a host device on external network 10 that has an IP address equal to the IP address of local network interface cart 21. In FIG. 22A, mimic device 20 is shown along with target legacy network printer 15 and host devices server 11 and workstation 12. External network interface card 22 is labeled as E.4, local network interface card 21 is labeled as L.1, target legacy network printer 15 is labeled as T.4, server 11 is labeled as H.1 and workstation 12 is labeled as H.2. These labels are for the purpose of explaining the use of the dynamic rules in the eight rule sets shown in FIG. 21.

In the scenario depicted in FIG. 22A, host device H.1 (server 11) has an IP address equal to the IP address of local network interface card 21. In this scenario, four possible network communications are depicted in FIG. 22A. First, host H.1 is sending a frame which should be intercepted for handling by E.4 of mimic device 20, such as by an application running in mimic device 20. Second, host H.1 is sending a frame that is for being passed through directly to target T.4. Third, Target T.4 is sending a frame that is to be intercepted for handling by L.1 of mimic device 20, such as by an application running in mimic device 20. Fourth, target T.4 is sending a frame which is to be passed through to host H.1. These four network communications shown in FIG. 22A are handled by the last four rule sets in table 160 of FIG. 21 having ID values of 4 to 7.

In the scenario depicted in FIG. 22B, host device H.2 (workstation 12) has an IP address which is not equal to the IP address of local network interface card 21. In this scenario, three possible network communications are depicted in FIG. 22B. First, host H.2 is sending a frame which should be intercepted for handling by E.4 of mimic device 20, such as by an application running in mimic device 20. Second, host H.2 is sending a frame that is for being passed through directly to target T.4. Third, target T.4 is sending a frame which is to be passed through to host H.2. These four network communications shown in FIG. 22B are handled by the first four rule sets in table 160 of FIG. 21 having ID values of 0 to 3.

Figure 23:
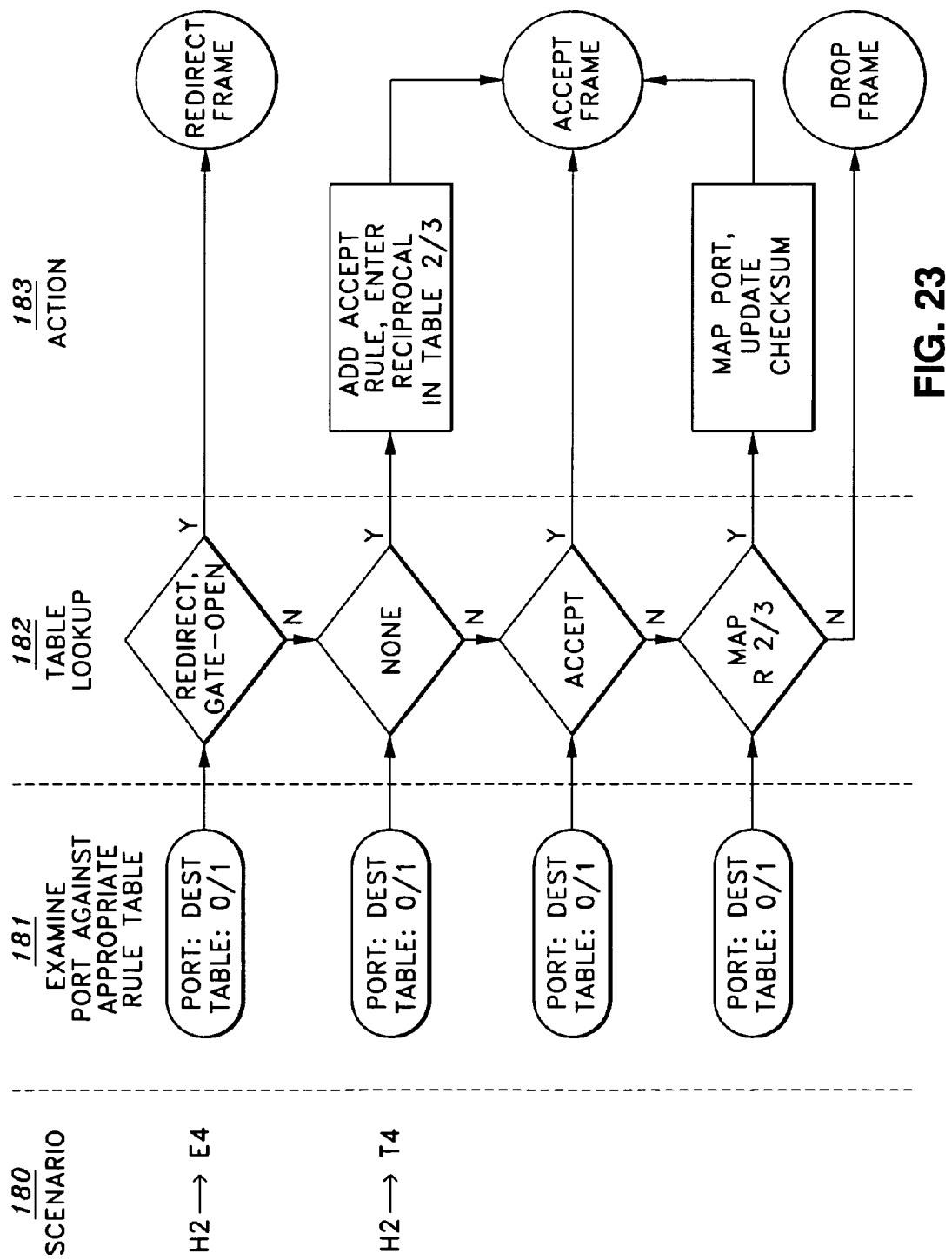
FIG. 23 is a block diagram for explaining dynamic rule application for a message from a host device in a first scenario according to the present invention.

FIG. 23 is a block diagram for explaining dynamic rule application to a frame from host device H.2 in the scenario depicted in FIG. 22B in which host device H.2 has an IP address which is not equal to the IP address of the local side L.1 of mimic device 20. As seen in FIG. 23, there are four columns for use in explaining how the appropriate rule sets are applied to a frame which is received by mimic device 20. Scenario column 180 describes where the frame originated and where the frame should end up. In FIG. 23 there are two scenarios under Scenario column 180, the first of which being a frame which was originated by host H.2 and which should end up at E.4 of mimic device 20, and the second of which being a frame which was originated by host H.2 and which should end up at target T.4. These scenarios are for explanatory purposes only, because mimic device 20 only knows that it received a frame from H.2 on external network 10, but mimic device 20 has not yet determined where the frame should actually be sent.

Column "Examine Port Against Appropriate Rule Table" 181 depicts the rule table that should be applied to the frame, depending on whether the frame is TCP or UDP protocol. Column "Table Lookup" 182 is the response provided from the appropriate rule table depicted in column 181. Action 183 is the action that is to be taken on the frame based on the response depicted in column 182. Accordingly, when a frame is received on E.4 of mimic device 20 and has a source IP address which is not equal to the local IP address of mimic device 20, either table 0 or table 1 is applied to the frame, depending on whether the frame is TCP or UDP. In particular, the destination port number contained in the frame is compared the entries in the rule table to determine if a rule exists for that port number.

Turning to columns 182 and 183, the result of the rule table lookup determines what action is to be taken. If the rule table returns a Redirect or a Gate-open rule, then the frame is redirected to an application executing in mimic device 20. If None is returned, then a rule does not presently exist for this port number, and therefore an Accept rule is added to the rule table 0 or 1, and a reciprocal rule is added to rule table 2 or 3, depending on whether the frame protocol is UDP or TCP, respectively. The frame is then accepted for passing to target T.4. If the rule table returns an Accept rule, then the frame is accepted for passing to target T.4. If the rule table returns a Map rule, then the port is mapped, the checksum of the frame is updated, and the frame is accepted for passing to target T.4. Otherwise, the frame is dropped, such as in the case that a Gate-closed rule is encountered, or an invalid response is returned from the rule table.

Figure 24:
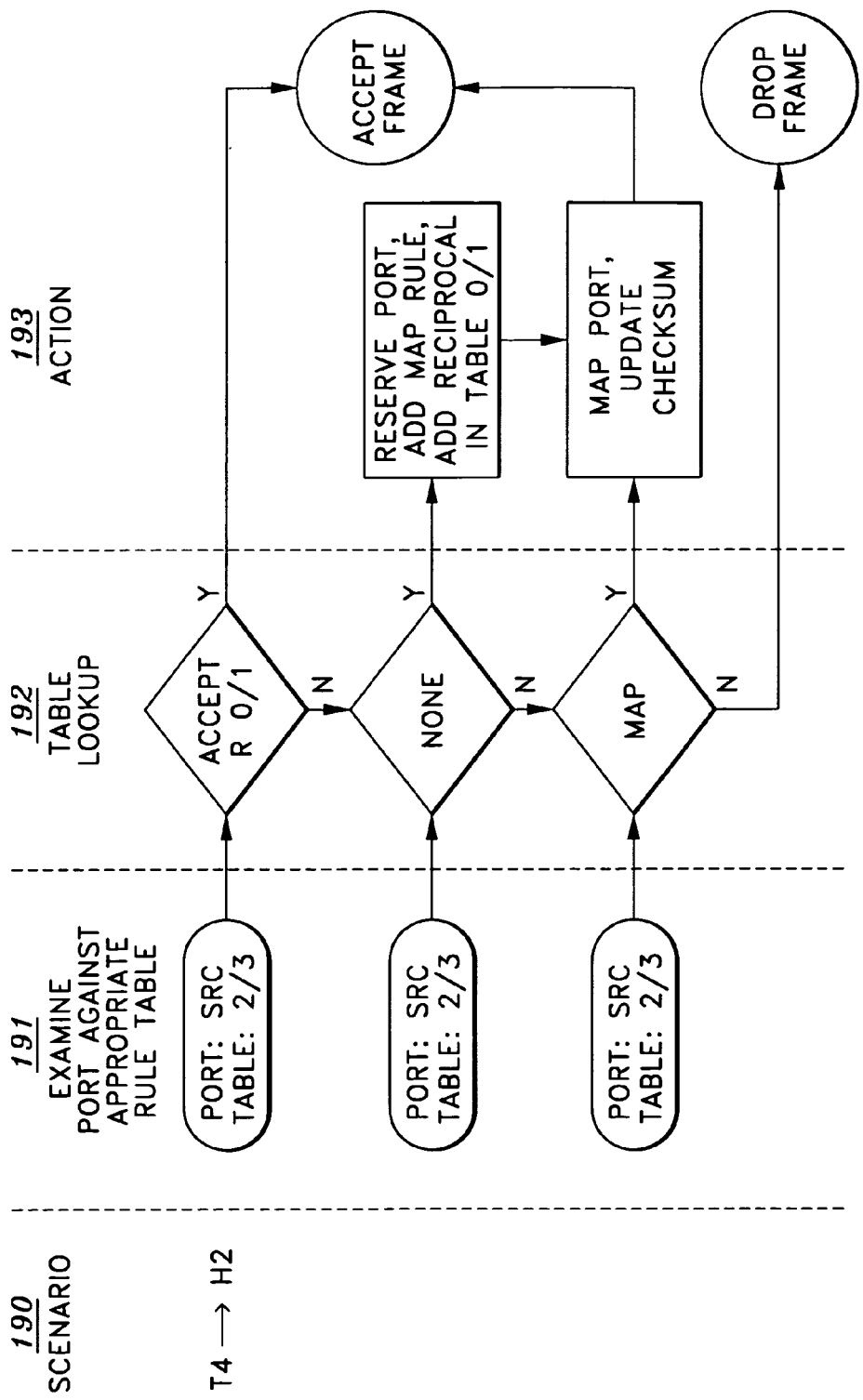
FIG. 24 is a block diagram for explaining dynamic rule application for a message from a target device in a first scenario according to the present invention.

FIG. 24 is a block diagram for explaining dynamic rule application to a frame from target T.4 in the scenario depicted in FIG. 22B in which host device H.2 has an IP address which is not equal to the IP address of the local side L.1 of mimic device 20. FIG. 24 is similar to FIG. 23 and therefore the layout and columns of FIG. 24 will not be described here for the sake of brevity. As seen in FIG. 24, there is one scenario under Scenario column 180 in which a frame was originated by target T.4 and should end up at host H.2. Mimic device 20 only knows that it received a frame from target T.4 on local network 14, but mimic device 20 has not yet determined where the frame should actually be sent.

Turning to column "Examine Port Against Appropriate Rule Table" 181, it can be seen that table 2 or 3 is applied to the frame, depending on whether the frame is TCP or UDP protocol. Column "Table Lookup" 182 is the response provided from the appropriate rule table depicted in column 181, and action 183 is the action that is to be taken on the frame based on the response depicted in column 182. In particular, the source port number contained in the frame is compared the entries in the applied rule table to determine if a rule exists for that port number.

Turning to columns 182 and 183, the result of the rule table lookup determines what action is to be taken. If the rule table returns an Accept rule, then the frame is accepted for passing to host H.2. If None is returned, then a rule does not presently exist for this port number, and therefore the next available port number is reserved, a map rule is added to table 2 or 3, and a reciprocal rule added to table 0 or 1, depending on whether the frame protocol is UDP or TCP, respectively. Then the port is mapped, the checksum of the frame is updated, and the frame is accepted for passing to target H.2. If the rule table returns a Map rule, then the port is mapped, the checksum of the frame is updated, and the frame is accepted for passing to target H.2. Otherwise, the frame is dropped, such as in the case that a Gate-closed rule is encountered, or an invalid response is returned from the rule table.

Figure 25:
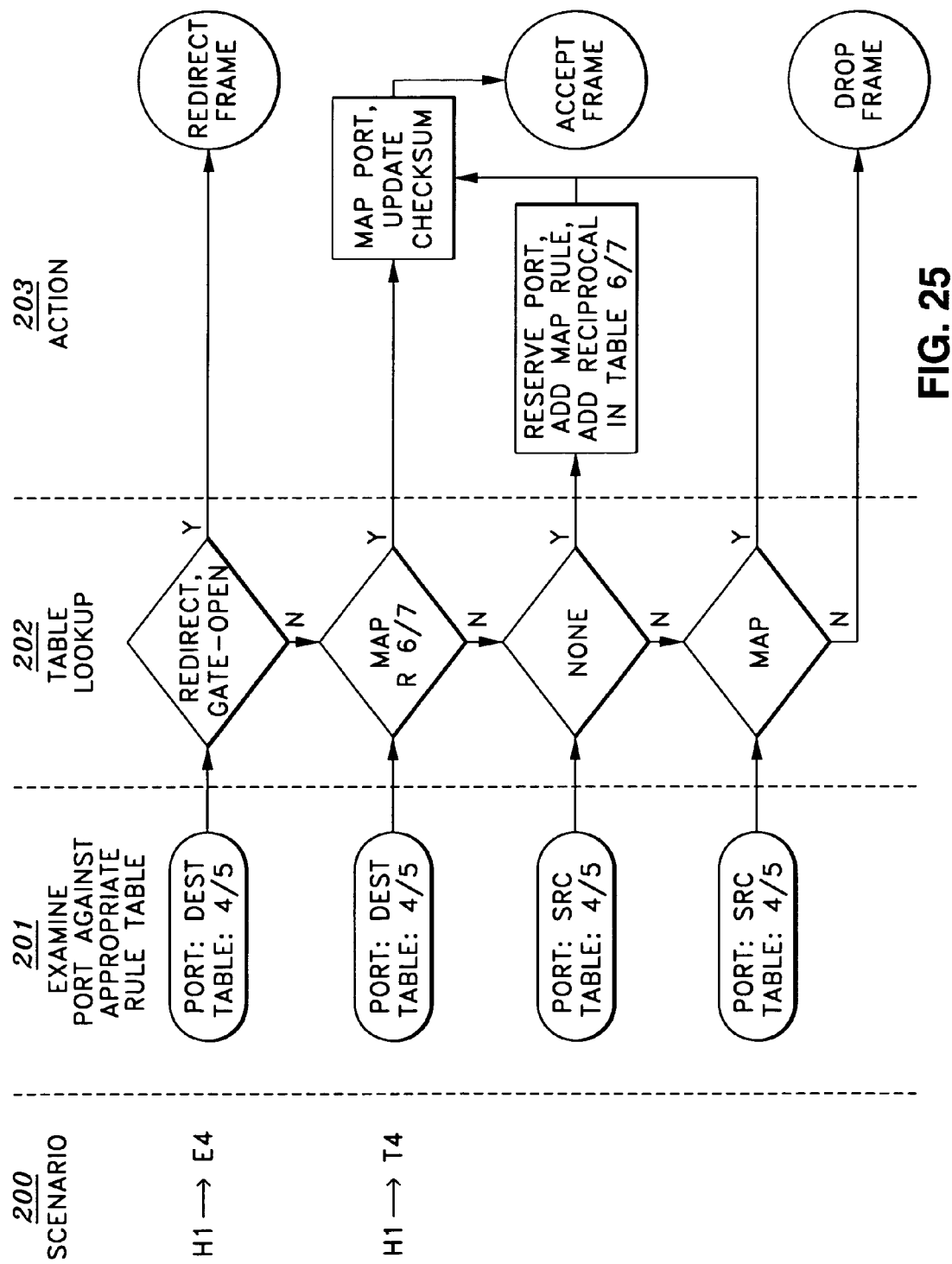
FIG. 25 is a block diagram for explaining dynamic rule application for a message from a host device in a second scenario according to the present invention.

FIG. 25 is a block diagram for explaining dynamic rule application to a frame from host device H.1 in the scenario depicted in FIG. 22A in which host device H.1 has an IP address which is equal to the IP address of the local side L.1 of mimic device 20. As seen in FIG. 25, there are two scenarios under Scenario column 180, the first of which being a frame which was originated by host H.1 and which should end up at E.4 of mimic device 20, and the second of which being a frame which was originated by host H.1 and which should end up at target T.4. These scenarios are for explanatory purposes only, because mimic device 20 only knows that it received a frame from H.1 on external network 10, but mimic device 20 has not yet determined where the frame should actually be sent.

In FIG. 25, when a frame is received on E.4 of mimic device 20 and has a source IP address which is equal to the local IP address of mimic device 20, either table 4 or table 5 is applied to the frame, depending on whether the frame is TCP or UDP. First, the destination port number contained in the frame is compared the entries in the applied rule table to determine if a rule exists for that port number. If the rule table returns a Redirect or a Gate-open rule, then the frame is redirected to an application executing in mimic device 20. If the rule table returns a Map rule, then the destination port is mapped, the checksum of the frame is updated, and the frame is accepted for passing to target T.4.

Next, the source port number contained in the frame is compared the entries in the applied rule table to determine if a rule exists for that port number. If None is returned, then a rule does not presently exist for this port number, and therefore the next available port number is reserved, a Map rule is added to rule table 4 or 5, and a reciprocal rule is added to rule table 6 or 7, depending on whether the frame protocol is UDP or TCP, respectively. The port is then mapped, the checksum of the frame is updated, and the frame is accepted for passing to target T.4. If the rule table returns a Map rule, then the port is mapped, the checksum of the frame is updated, and the frame is accepted for passing to target T.4. Otherwise, the frame is dropped, such as in the case that a Gate-closed rule is encountered, or an invalid response is returned from the rule table.

Figure 26:
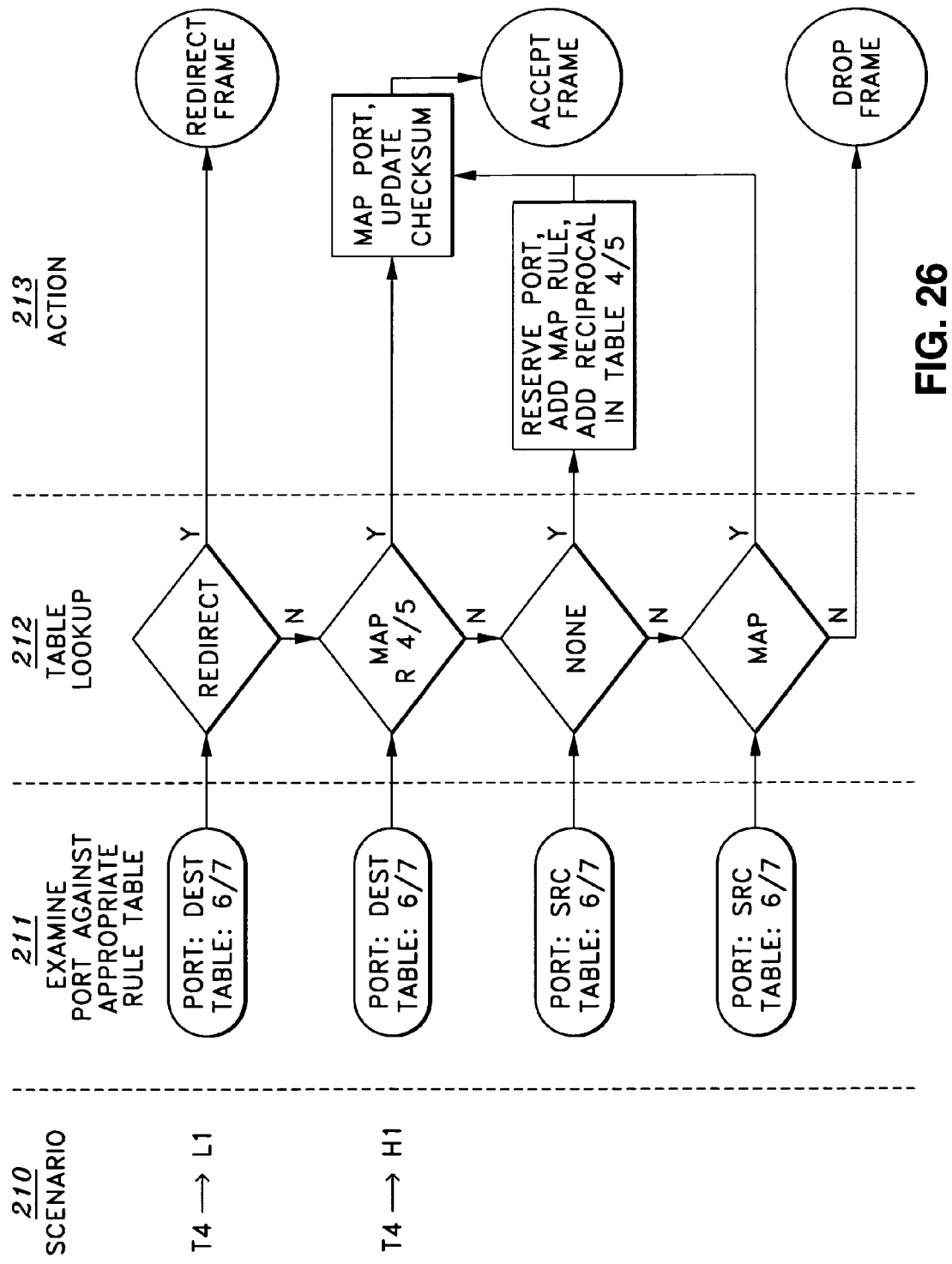
FIG. 26 is a block diagram for explaining dynamic rule application for a message from a target device in a second scenario according to the present invention.

FIG. 26 is a block diagram for explaining dynamic rule application to a frame from host device H.1 in the scenario depicted in FIG. 22A in which host device H.1 has an IP address which is equal to the IP address of the local side L.1 of mimic device 20. As seen in FIG. 26, there are two scenarios under Scenario column 180, the first of which being a frame which was originated by target T.4 and which should end up at the local side L.1 of mimic device 20, and the second of which being a frame which was originated by target T.4 and which should end up at host H.1. These scenarios are for explanatory purposes only, because mimic device 20 only knows that it received a frame from target T.4 on local network 14, but mimic device 20 has not yet determined where the frame should actually be sent.

In FIG. 26, when a frame is received on L.1 of mimic device 20 and has a source IP address which is equal to the local IP address of mimic device 20, either table 6 or table 7 is applied to the frame, depending on whether the frame is TCP or UDP. First, the destination port number contained in the frame is compared the entries in the applied rule table to determine if a rule exists for that port number. If the rule table returns a Redirect rule, then the frame is redirected to an application executing in mimic device 20. If the rule table returns a Map rule, then the destination port is mapped, the checksum of the frame is updated, and the frame is accepted for passing to target H.1.

Next, the source port number contained in the frame is compared the entries in the applied rule table to determine if a rule exists for that port number. If None is returned, then a rule does not presently exist for this port number, and therefore the next available port number is reserved, a Map rule is added to rule table 6 or 7, and a reciprocal rule is added to rule table 4 or 5, depending on whether the frame protocol is UDP or TCP, respectively. The port is then mapped, the checksum of the frame is updated, and the frame is accepted for passing to target H.1. If the rule table returns a Map rule, then the port is mapped, the checksum of the frame is updated, and the frame is accepted for passing to target H.1. Otherwise, the frame is dropped, such as in the case that a Gate-closed rule is encountered, or an invalid response is returned from the rule table.

In this manner, the present invention implements dynamic rules to achieve appropriate routing of frames that are received by mimic device 20 on either local network 14 or external network 10. The rules also prevent IP address and port number conflicts in unique circumstance when the IP address of a host device on external network 10 is the same as that of local network interface card 21 on mimic device 20.

Based on the above discussion and accompanying figures, it can be appreciated that the present invention provides a general, efficient manner in which to augment the functional capabilities of existing, legacy network devices in a transparent fashion. Accordingly, the present invention reduces the need for replacing legacy network devices, such as network printers, with newer versions in order to provide support for new enterprise functions. In addition, the present invention is incorporated into the network environment with minimal configuration on the part of a user or system administrator.

It should be appreciated that the mimic device described above is not limited to augmenting the functional capabilities of legacy network printers, but can also be applied to network copiers, network scanners, network workstations and other network devices. In addition, the above-described mimic device is not limited to the functional augmentation of network devices, but can also be easily configured to perform other functions. The rules contained in the rules tables described above can easily be configured by the applications manager and applications residing in the mimic device to allow the mimic device to perform a variety of different functions.

In a particular embodiment, the mimic device can be used to provide network connectivity to a device which does not inherently have such capability. In this embodiment, local network 14 would be a Universal Serial Bus (USB) network or another type of serial network and local network interface card 21 would support USB connectivity. The rules would then be configured to have mimic device 20 act on network messages from external network 10 which are directed to IP addresses assigned to the printers on the USB local network 14. One of other application modules 72 would then act as a translator between IP messages on external network 10 and USB messages on local network 14.

In a similar fashion, mimic device 20 can also be used as a docking station which connects to a device, such as a digital camera via local network 14 acting as a USB, or through another serial interface in place of local network interface card 21. For example, a digital camera connects to a serial port on mimic device 20 which then downloads digital images from the digital camera to the mimic device and passes the digital images over external network 10 to server 11 for storage. Again, this simply requires a reconfiguration of the rules described above, which can be performed by application manager module 78 and/or other applications in mimic device 20.

Mimic device 20 can also utilize its two independent network interface cards to act as a universal networking device. For example, the rules can be configured to instruct mimic device 20 to act as a router, a firewall, a NAT, a server or other network device. This is simply a matter of having one of the applications in mimic device 20 to configure the rules to instruct NTC 65 to perform the desired handling of frames detected on external network 10 and local network 14. In this regard, the rules in mimic device 20 can also be configured to simply monitor network traffic on one or both of external network 10 and local network 14, which could include capturing and recording some or all of the network traffic. Lastly, the rules of mimic device 20 can be configured to detect and intercept the transmission of undesirable network traffic in a defensive mode, or to send undesirable network traffic as an offensive, hostile mode.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for mimicking network devices, the method being performed in a computing device having first and second network interface cards, the first network interface card connecting the computing device to an external network and the second network interface card connecting the computing device to a local network, the method comprising the steps of:

obtaining an IP address of a device on the local network by capturing a frame containing the device's IP address;

determining an IP address for the second network interface card based on the obtained IP address of the device on the local network; and assigning the determined IP address to the second network interface card, tracking a legacy source port identifier in a message from a legacy network device on the local network, wherein the message has a destination IP address equal to the assigned IP address of the second network interface card;

creating a first mapping rule which corresponds to the legacy network device and which maps the legacy source port identifier to a new source port identifier; and creating a second mapping rule which corresponds to the legacy network device and which maps the new source port identifier to the legacy source port identifier, wherein the first mapping rule is subsequently applied to each message detected on the local network from the legacy network device which has a destination IP address equal to the assigned IP address of the second network interface card, and which contains the legacy source port identifier, so as to replace the legacy source port identifier in the message with the new source port identifier, and wherein the second mapping rule is subsequently applied to each message detected on the external network that has a destination IP address equal to an address of the legacy network device and that contains the new source port identifier, so as to replace the new source port identifier in the message with the legacy source port identifier;

detecting a message from a host device on the external network which has a source IP address equal to the assigned IP address of the second network interface card;

obtaining an initial source port identifier contained in the detected message;

obtaining a new host source port identifier;

creating a third mapping rule which corresponds to the host device and which maps the initial source port identifier to the new host source port identifier; and creating a fourth mapping rule which corresponds to the host device and which maps the new host source port identifier to the initial source port identifier.

2. A method according to claim 1, wherein the IP address for the second network interface card is determined by subtracting one address from the obtained IP address of the device on the local network.

3. A method according to claim 1, further including a step of
determining if the legacy source port identifier corresponds to an application executing on the computing device, wherein the first and second mapping rules are created based on the determination.

4. A method according to claim 1,
wherein the new source port identifier is obtained from an operating system executing on the computing device.

5. A method according to claim 1, wherein the IP address of the device on the local network is obtained by listening for frames on the local network and capturing the frame containing the device's IP address.

6. A method according to claim 1, wherein the IP address of the device on the external network is obtained in response to a discovery query message issued on the external network by the computing device.

7. A method according to claim 1, further comprising the steps of:
entering the first mapping rule in a local mapping rule table; and
entering the second mapping rule in an external mapping rule table.

8. A method according to claim 1,
wherein the third mapping rule is subsequently applied to each message detected on the external network that has a source address equal to that of the host device and that contains the initial source port identifier, so as to replace the initial source port identifier in the message with the new host source port identifier, and
wherein the fourth mapping rule is subsequently applied to each message detected on the local network from the legacy network device which has a destination IP address equal to the assigned IP address of the second network interface card, and which contains the new host source port identifier, so as to replace the new host source port identifier in the message with the initial source port identifier.

9. A method according to claim 1, wherein the new host source port identifier is obtained from an operating system executing on the computing device.

10. A method according to claim 1, further comprising the steps of:
entering the third mapping rule in an external mapping rule table; and
entering the fourth mapping rule in a local mapping rule table.

11. A computing device for mimicking network devices, the computing device having first and second network interface cards, the first network interface card connecting the computing device to an external network and the second network interface card connecting the computing device to a local network, said computing device comprising:
a program memory for storing process steps executable to perform a method according to any one of claims 1, 2, 3, 4 to 7 and 8 to 10; and
a processor for executing the process steps stored in said program memory.

12. Computer-executable process steps stored on a non-transitory computer readable storage medium, said computer-executable process steps for mimicking network devices and for being performed in a computing device having first and second network interface cards, the first network interface card connecting the computing device to an external network and the second network interface card connecting the computing device to a local network, said computer-executable process steps comprising process steps executable to perform a method according to any one of claims 1, 2, 3, 4, to 7 and 8 to 10.

13. A non-transitory computer-readable storage medium which stores computer-executable process steps, the computer-executable process steps to mimic network devices and to be performed in a computing device having first and second network interface cards, the first network interface card connecting the computing device to an external network and the second network interface card connecting the computing device to a local network, said computer-executable process steps comprising process steps executable to perform a method according to any one of claims 1, 2, 3, 4 to 7 and 8 to 10.

14. A method according to claim 1, further including a determining step for determining if a device on the external network shares the determined IP address assigned to the second network interface card.

15. A method according to claim 14, wherein the computing device adopts the Ethernet address of the device on the external network for the second network interface card if it is determined that the device on the external network shares the determined IP address assigned to the second network interface card.

16. A method according to claim 14, wherein the ARP cache of the device on the local network is updated if it is determined that the device on the external network shares the determined IP address assigned to the second network interface card.

17. A method according to claim 1, wherein if the obtained IP address of the device on the local network is the lowest assignable value for an IP address on the local network, the IP address for the second network interface card is determined by adding one address to the obtained IP address of the device on the local network.

18. The method according to claim 7, wherein the first mapping rule is purged from the local mapping rule table if a predetermined amount of time has passed since the first mapping rule was last used, and wherein the second mapping rule is purged from the external mapping rule table if a predetermined amount of time has passed since the second mapping rule was last used.

19. The method according to claim 10, wherein the third mapping rule is purged from the local mapping rule table if a predetermined amount of time has passed since the third mapping rule was last used, and wherein the fourth mapping rule is purged from the external mapping rule table of a predetermined amount of time has passed since the fourth mapping rule was last used.

20. The method according to claim 7, wherein the rules in the local mapping rule table do not contain terminal actions.

21. The method according to claim 10, wherein the rules in the local mapping rule table do not contain terminal actions.

* * * * *